(12) United States Patent
Majidi et al.

(10) Patent No.: US 11,682,276 B2
(45) Date of Patent: Jun. 20, 2023

(54) MULTI-SITE DAMAGE SENSING AND LOCALIZATION SOFT-MATTER ELECTRONICS AND RELATED SYSTEMS AND METHODS

(71) Applicant: Carnegie Mellon University, Pittsburgh, PA (US)

(72) Inventors: Carmel Majidi, Pittsburgh, PA (US); Michael D Bartlett, Ames, IA (US); Eric J Markvicka, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 138 days.

(21) Appl. No.: 17/095,564

(22) Filed: Nov. 11, 2020

(65) Prior Publication Data

US 2021/0209906 A1    Jul. 8, 2021

Related U.S. Application Data

(60) Provisional application No. 62/933,669, filed on Nov. 11, 2019.

(51) Int. Cl.
  *G08B 7/06*     (2006.01)
  *B05D 1/32*     (2006.01)
  (Continued)

(52) U.S. Cl.
  CPC .............. *G08B 7/06* (2013.01); *B05D 1/02* (2013.01); *B05D 1/322* (2013.01); *C08K 3/08* (2013.01);
  (Continued)

(58) Field of Classification Search
  None
  See application file for complete search history.

(56) References Cited

U.S. PATENT DOCUMENTS

| | | | |
|---|---|---|---|
| 2017/0218167 A1 | 8/2017 | Majidi et al. | |
| 2019/0181069 A1* | 6/2019 | Rykaczewski | ........ B32B 27/283 |

(Continued)

FOREIGN PATENT DOCUMENTS

CN      209756481      * 12/2019

OTHER PUBLICATIONS

Markvicka, E. J. et al., Soft Electronic Skin for Multi-Site Damage Detection and Localization, Advanced Functional Materials, 2019, Wiley-VCH Verlag GmbH & Co. KGaA, Weinheim.
(Continued)

*Primary Examiner* — Jeffrey D Washville
(74) *Attorney, Agent, or Firm* — Dentons Cohen & Grigsby P.C.

(57) ABSTRACT

Soft-matter technologies are essential for emerging applications in wearable computing, human-machine interaction, and soft robotics. However, as these technologies gain adoption in society and interact with unstructured environments, material and structure damage becomes inevitable. A robotic material that mimics soft tissues found in biological systems may be used to identify, compute, and respond to damage. This material includes liquid metal droplets dispersed in soft elastomers that rupture when damaged to create electrically conductive pathways that are identified with a soft active-matrix grid. These technologies may be used to autonomously identify damage, calculate severity, and respond to prevent failure within robotic systems.

20 Claims, 31 Drawing Sheets

(51) Int. Cl.
*B05D 1/02* (2006.01)
*H01B 5/14* (2006.01)
*C08K 3/10* (2018.01)
*C08K 3/08* (2006.01)
*H01B 1/22* (2006.01)

(52) U.S. Cl.
CPC ............... *C08K 3/10* (2013.01); *H01B 1/22* (2013.01); *H01B 5/14* (2013.01); *C08K 2201/001* (2013.01)

(56) References Cited

U.S. PATENT DOCUMENTS

| 2020/0296825 A1 | 9/2020 | Ozdoganlar et al. |
| 2020/0328007 A1 | 10/2020 | Majidi et al. |

OTHER PUBLICATIONS

Markvicka, E. J. et al., An autonomously electrically self-healing liquid metal-elastomer composite for robust soft-matter robotics and electronics, Nature Materials, 2018, Macmillan Publishers Limited.

Bartlett, M. D. et al., Soft-matter damage detection systems for electronics and structures, SPIE Smart Structures + Nondestructive Evaluation, 2019, Denver, Colorado.

* cited by examiner

MULTI-SITE DAMAGE SENSING AND LOCALIZATION SOFT-MATTER ELECTRONICS AND RELATED SYSTEMS AND METHODS

CROSS REFERENCE TO RELATED APPLICATION

This application claims the benefit of U.S. Provisional Application No. 62/933,669, filed Nov. 11, 2019, the entire contents of which is incorporated herein by reference.

GOVERNMENT RIGHTS

This invention was made with Government support under NNX14AO49G awarded by the NASA and FA9550-16-I-0566 awarded by the USAF/AFOSR. The Government has certain rights in the invention.

BACKGROUND

Soft-matter technologies may be useful for emerging applications in wearable computing, human-machine interaction, and soft robotics. However, as these technologies leave the laboratory and interact with dynamic and unstructured environments, material and structural damage may occur. Conventional systems that detect or self-report damage may use rigid hardware to electrically, visually, or mechanically identify damage. In contrast, biological organisms may use soft tissue to autonomously detect, communicate, and respond to damage. Accordingly, more efficient and/or cost effective soft-matter technologies may be desirable.

SUMMARY

The present invention is directed to biomimetic composites having actuation, communication, and/or computation that may autonomously identify damage, calculate severity, and respond to reduce/prevent failure within robotic systems. The biomimetic composites may be soft and highly deformable relative to conventional rigid systems.

The present invention is directed to robotic material analogs to soft nervous tissue that may identify, compute, and/or respond to damage in real time. The robotic material analog may generally comprise a soft composite material having liquid metal droplets dispersed in an elastomer matrix that may rupture and create digital signal pathways when the material is damaged and/or the embedded droplets are ruptured. The embedded droplets may permanently store mechanical damage from compression, fracture and/or puncture as a local change in electrical conductivity that may be identified and located using a highly deformable active-matrix grid. The stored mechanical damage may be communicated via an audible output, a visual output, or a tactile output.

The present invention is directed to a method of using damage sensing composite materials to augment soft, untethered inflatable humanoid structures that resist failure from otherwise detrimental puncture damage.

The present invention is directed to methods of making and using the biomimetic composites and robotic material analogs as well.

BRIEF DESCRIPTION OF THE FIGURES

The devices and processes described herein may be better understood by considering the following description in conjunction with the accompanying drawings; it being understood that this disclosure is not limited to the accompanying drawings.

FIG. 1A shows the human body's response to harmful external stimuli: detection (firing of nociceptors), communication (firing of action potentials), and response (activation of motor pathways). FIG. 1B shows the artificial nervous tissue's response to mechanical damage: detection (local change in conductivity), communication (flow of electrical current), and response (algorithmic response). FIG. 1C shows damage sensing composite materials according to the present invention comprising microdroplets of liquid metal (LM) embedded within a hyperelastic material that ruptures upon induced mechanical damage to generate a percolating or continuous conductive network of liquid metal. FIG. 1D shows the sequence of a notched sample that is strained until mechanical failure, in which the propagation of the notch generates a conductive network, as indicated by the illumination (i.e., the activation) of the LEDs (•).

FIG. 2A shows stress-strain response under uniaxial extension to mechanical failure for two oligomer/curing agent ratios (5:1, 10:1; $\alpha$=100%) four different blends of Sylgard 184 and Sylgard 527 ($\alpha$=80, 60, 40, 20%, where $\alpha$ is the ratio of Sylgard 184 to Sylgard 527). FIG. 2B shows modulus as a function of elastomer blend ($\emptyset$=0, 50%). FIG. 2B Inset shows the composite modulus, $E_c$, as a function of elastomer modulus, $E_e$, and Eshelby's inclusion theory (dashed line), assuming incompressible fluidic inclusions, $E_i$=0 Pa. FIG. 2C shows mechanical failure strain as a function of elastomer blend ($\emptyset$=0, 50%). FIG. 2D shows uniaxial extension strain upon which an electrical network is formed. For samples blended with Sylgard 527, an electrical network did not form before mechanical failure. FIG. 2E shows compression force sufficient to cause the formation of an electrical network. Electrical activation is intermittent for the $\alpha$=40% blend and does not occur for about half of the samples tested (N=12). FIG. F shows there is a negligible influence on the stress-strain response of ripstop nylon fabric when coated with the LM-elastomer composite material. All error bars are the standard deviation. (for FIGS. 2B,C,D, N=3, and for FIG. 2E, N=5).

FIG. 3A shows a sequence of mechanical damage induced by a precision knife. The propagation of damage is indicated by the illuminated LEDs (•). FIG. 3A Inset shows an image of the cut surface. FIG. 3B shows the damage sensing composite fabricated on a variety of substrates while maintaining electrical insulation. FIG. 3C shows upon cutting the substrate, the material activates on all substrates (bottom row), as indicated by the illuminated LEDs (•).

FIG. 4A shows the damage detection composite with spray deposited 2D grid of LM. FIG. 4B shows electrical circuit used to detect and localize changes in conductivity (damage). FIG. 4C shows current flow through the thickness of the composite when mechanical damage occurs. FIG. 4D shows random sequence of 19 damage events and FIG. 4E shows the estimated probability of damage. The shading of each node is proportional to the probability of damage at that location.

FIG. 5A shows the damage sensing composite after rupture from two .22-caliber long rifle projectiles. FIGS. 5B and 5C show the projectile passing through the composite supported as a membrane on an acrylic frame. Damage is detected and localized as indicated by the boxes.

FIG. 6A shows a soft, untethered inflatable humanoid structure with programmable fan for inflation augmented with the damage sensing composite. The fan is shown outside of the inflatable structure for visualization. FIG. 6B shows a mobile computing platform used for visualization of damage, recording damage and pressure data, and communicating the data via a wireless link between the damage sensing composite and programmable fan. FIGS. 6C and 6D show damage induced using a precision knife. FIG. 6C shows the unmodified inflatable humanoid structure unable to detect any environmental changes and quickly deflates as the area of damage increased. FIG. 6D shows the augmented inflatable humanoid structure detecting and responding to the environmental changes by increasing the velocity of the fan (i.e., the activation of the fan) based on the estimated area of damage. FIG. 6D Inset shows a plot of the fan control signal as damage is detected and the velocity of the fan is increased to compensate for the loss in pressure. FIG. 6C (bottom) shows the approximate area of damage. FIG. 6E shows the change in pressure of the inflatable humanoid structure is almost undetectable using a high resolution barometer (±1 Pa) when failure occurs. FIG. 6E shows during response to damage, a slight increase in pressure is observed for the augmented humanoid structure. Note, a y axis offset is applied to the data to assist in visualization of the data.

FIG. 9A shows a histogram of the percent of analyzed particles versus major radii with $\alpha$ ranging from 100 to 20%. FIG. 9B shows a histogram of the percent of analyzed particles versus the aspect ratio of the particles. Included is the Gaussian fit of the data with mean and standard deviation. The size of the analyzed area is 800×600 µm$^2$.

The softer elastomer blends do not form a percolating network before elastomer failure ($\alpha=20\%$) or intermittently form an unstable network directly before elastomer failure ($\alpha=40\%$).

Figure 11A:
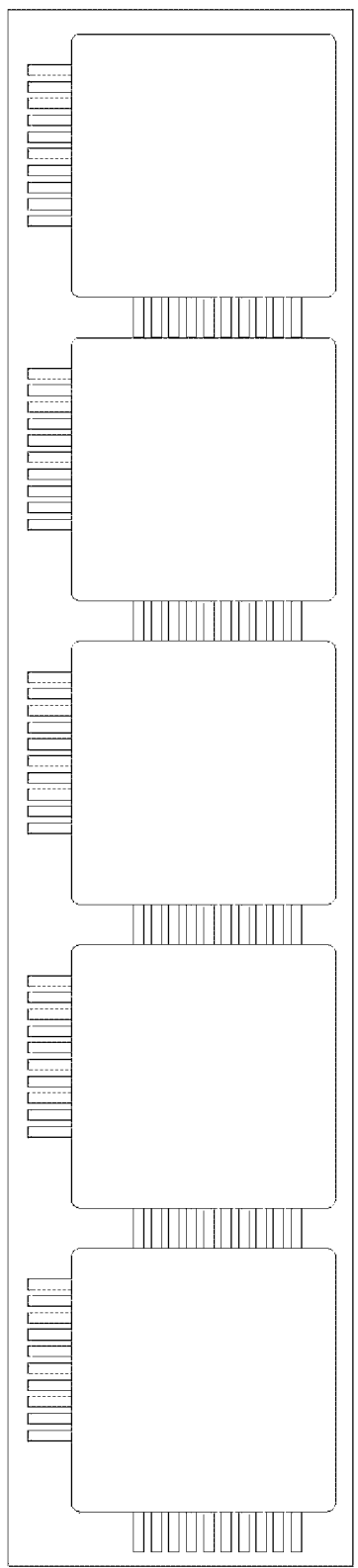
Figure 11B:
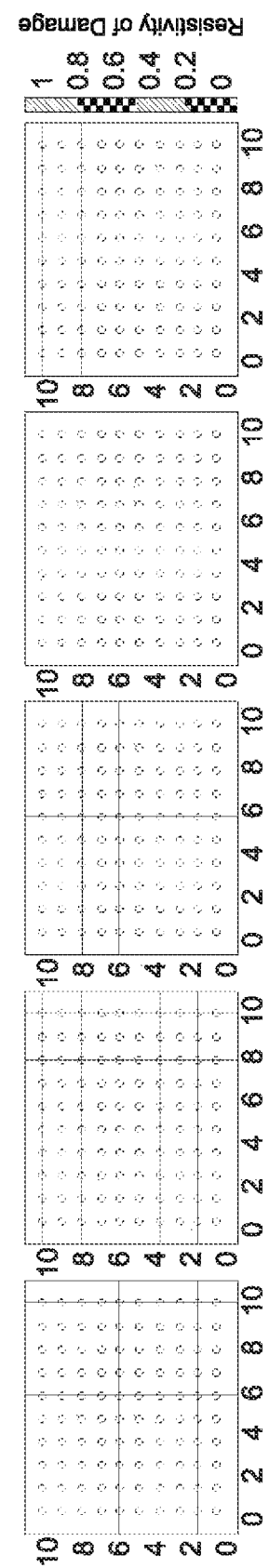
Figure 11C:
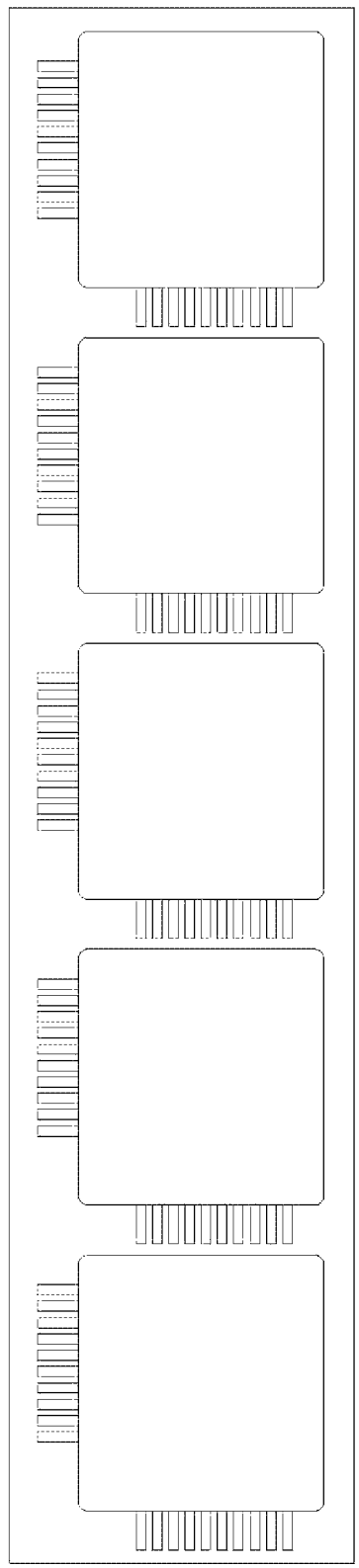
Figure 11D:
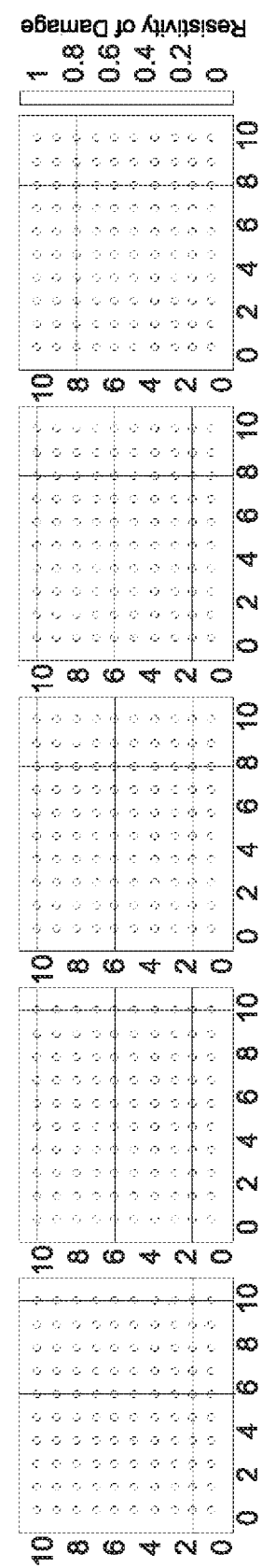

FIGS. 11A-D show upper and lower bounds of damage detection and localization for liquid metal (LM) elastomer composites for autonomous damage detection according to the present invention. FIG. 11A shows a sequence of 19 damage events. FIG. 11 shows 2 events localized with 100% probability. FIG. 11C shows a sequence of 19 damage events. FIG. 11D shows 18 events localized with 100% probability.

Figure 12:
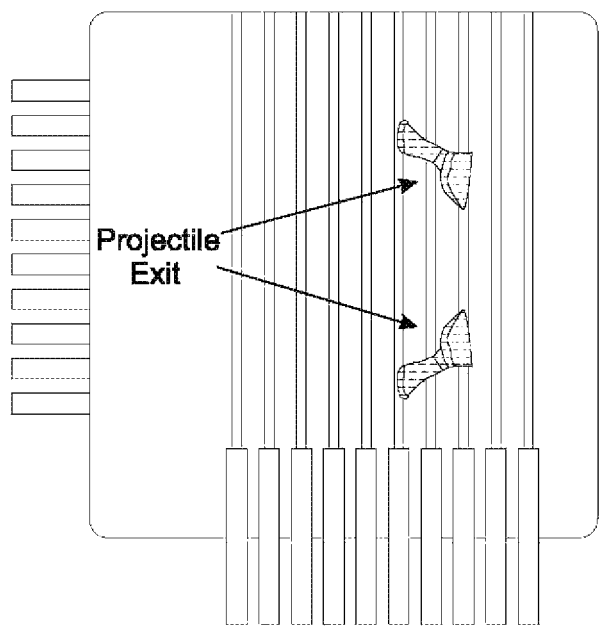

FIG. 12 shows the projectile exit of the humanoid structure of FIG. 6.

Figure 13A:
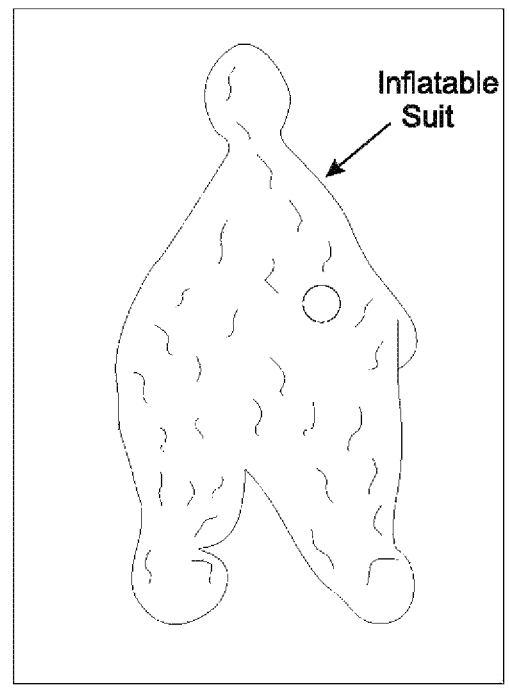
Figure 13B:
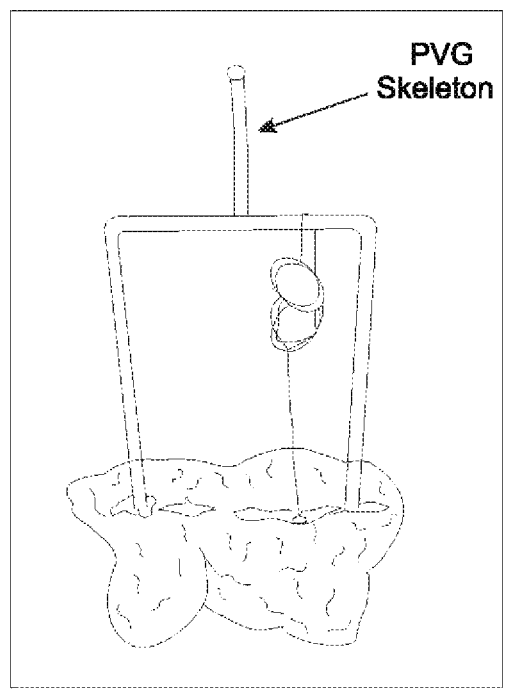
Figure 13C:
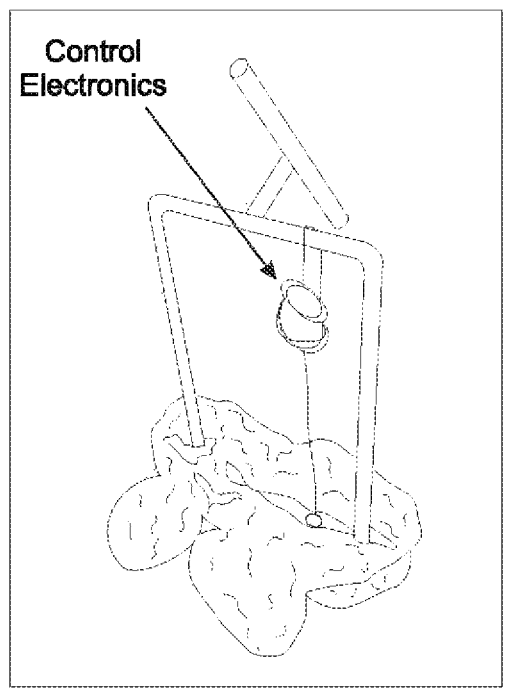

FIGS. 13A-C show a soft robot mimic construction including liquid metal (LM) elastomer composites for autonomous damage detection according to the present invention. FIG. 13A shows a completely deflated soft robot mimic. FIG. 13B shows a front view of plastic skeleton to support the inflatable suit. FIG. 13C shows an isometric view of plastic skeleton, control electronics, and battery.

Figure 14A:
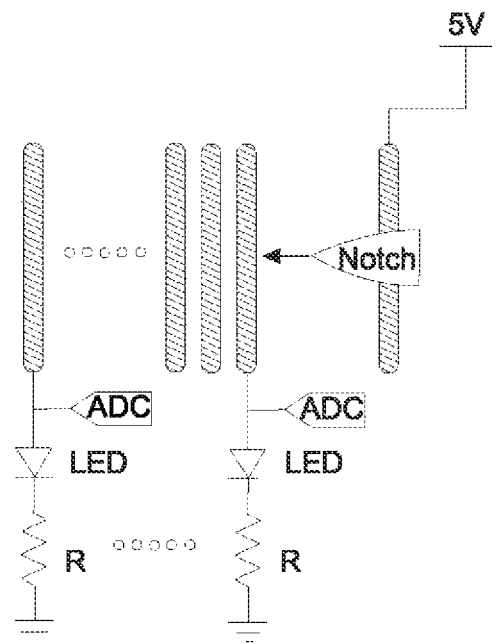
Figure 14B:
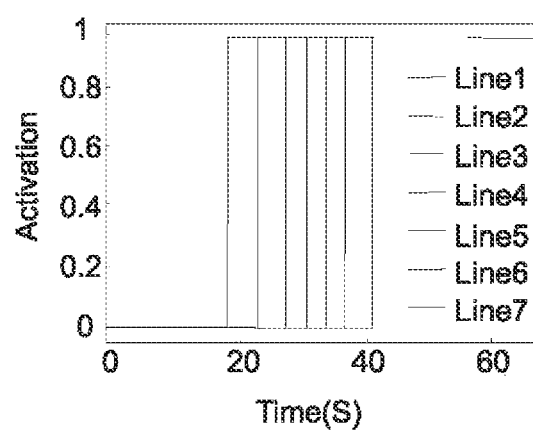

FIGS. 14A and 14B show damage detection and localization in one dimensional (1D) for liquid metal (LM) elastomer composite materials for autonomous damage detection according to the present invention. FIG. 14A shows a schematic of detection scheme as a notch propagates through the sample. The notch causes a change in conductivity, completing the LED circuit. FIG. 14B shows representative activation signals liquid metal (LM) elastomer composite materials for autonomous damage detection according to the present invention.

Figures 15A, 15B:
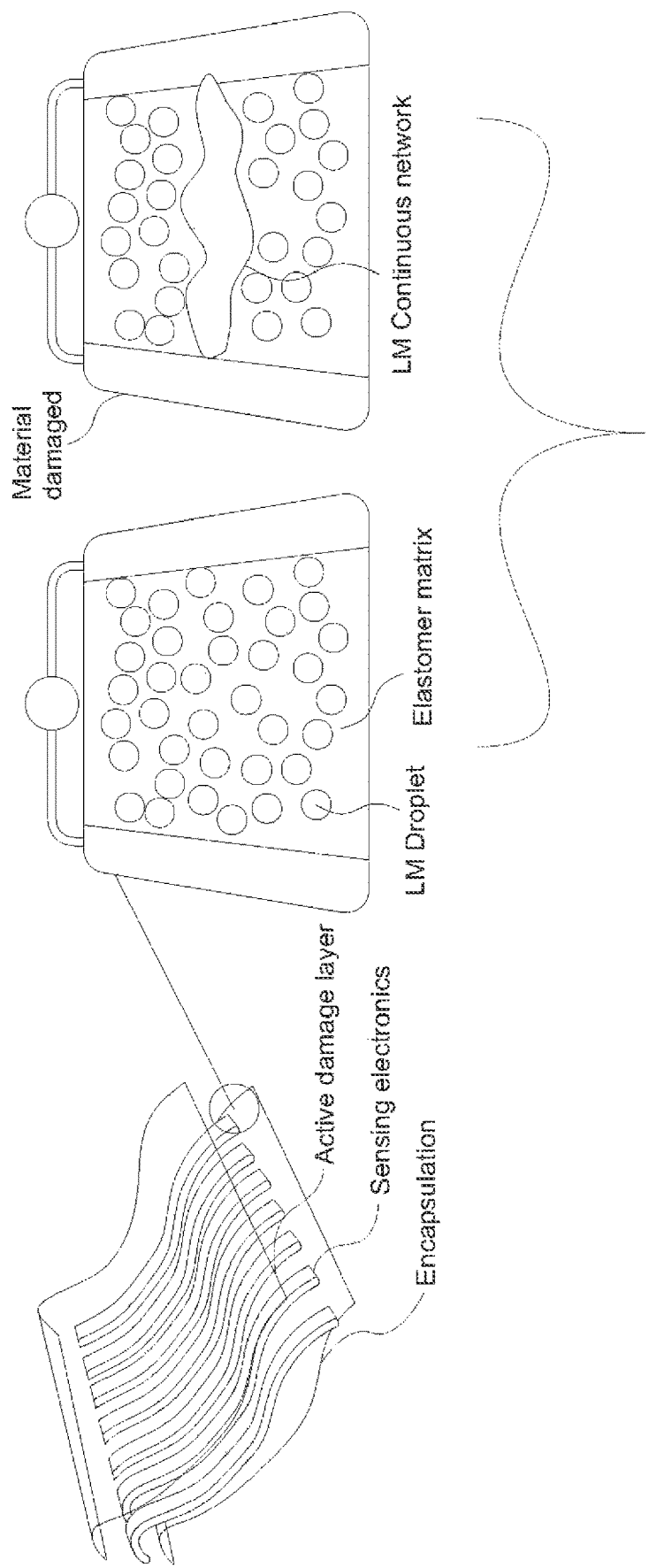

FIGS. 15A and 15B show sensing architecture including an active damage layer of LM composite materials with LM sensing electronics encapsulated in soft elastomer according to the present invention. FIG. 15B shows a schematic showing the structure of the active damage layer having LM droplets dispersed in an elastomer matrix. Prior to damage, (FIG. 15B at left) the droplets are isolated and the material is electrically insulating. When damage is induced, (FIG. 15B at right) the LM droplets rupture and connect together forming a percolated, electrically conductive network. The damage to the LM composite material causing the conductivity may be permanent.

Figure 16A:
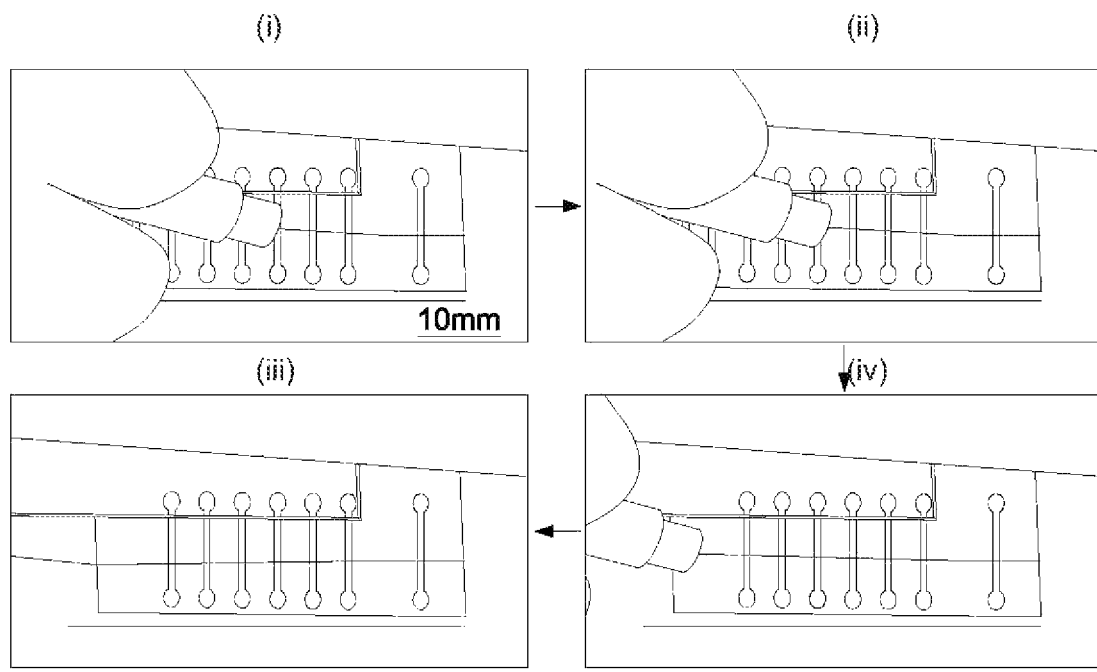
Figure 16B:
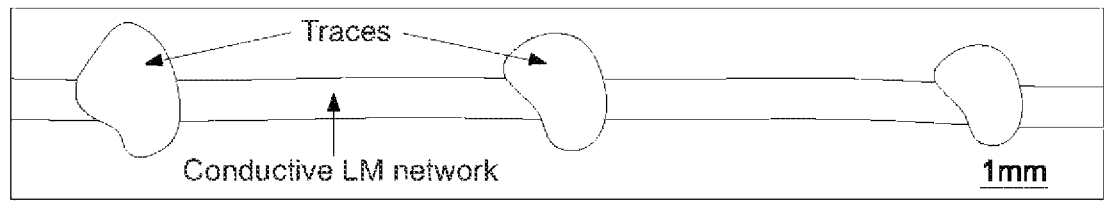

FIG. 16A show the time sequence showing the cutting of a film comprising the liquid metal (LM) elastomer composite materials for autonomous damage detection according to the present invention and damage indication by LEDs. FIG. 16B shows a cross-sectional micrograph showing the conductive LM networks upon damage which are sensed by the LM traces.

Figure 17A:
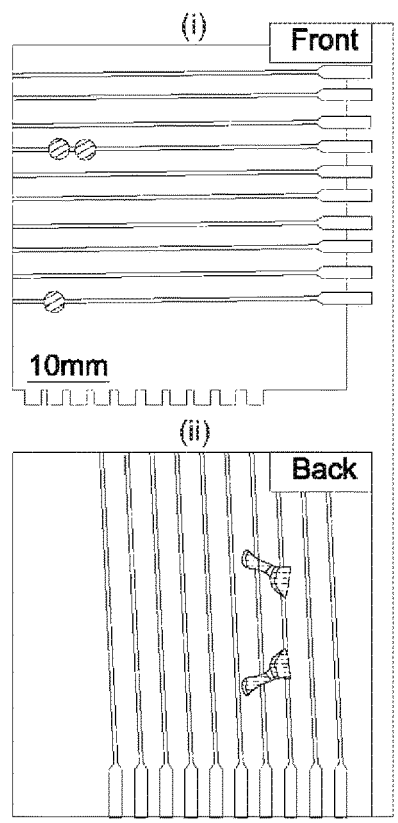
Figure 17B:
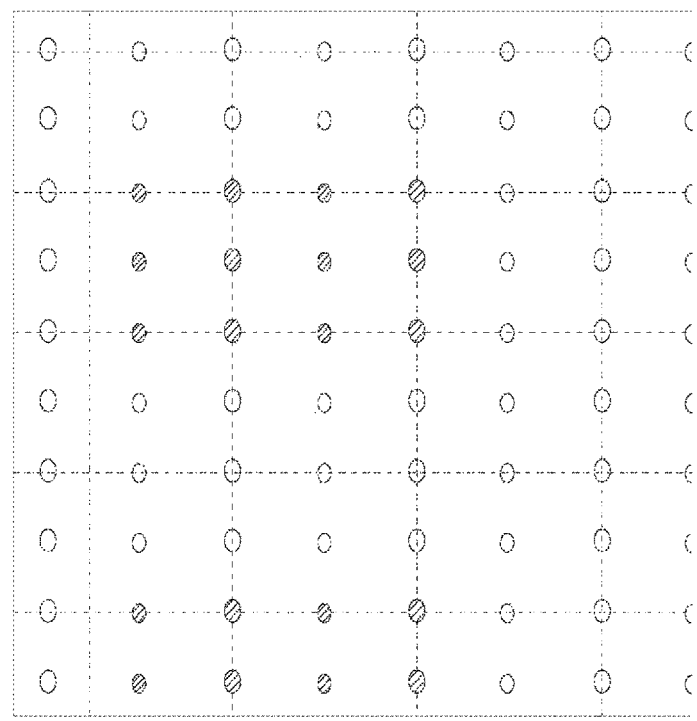

FIGS. 17A-B show multiple ballistic damage points to liquid metal (LM) elastomer composite materials for autonomous damage detection according to the present invention, wherein FIG. 17B shows the damage identified, and FIG. 17B shows the damage quantified (plot), and communicated in real-time. The front and back images (FIG. 17A) show the damage inflicted in the soft matter damage detection system with ballistic impact.

Figure 18A:
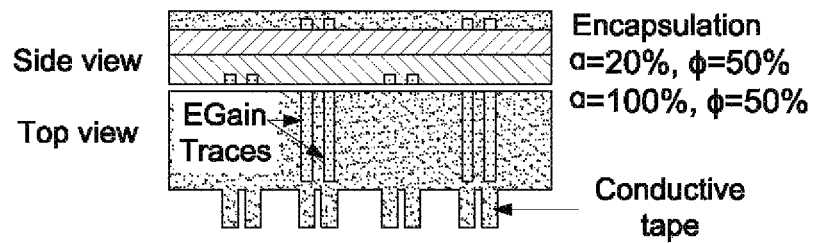
Figure 18A:
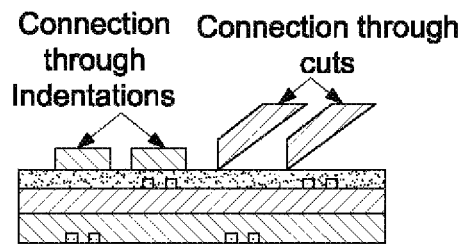
Figure 18B:
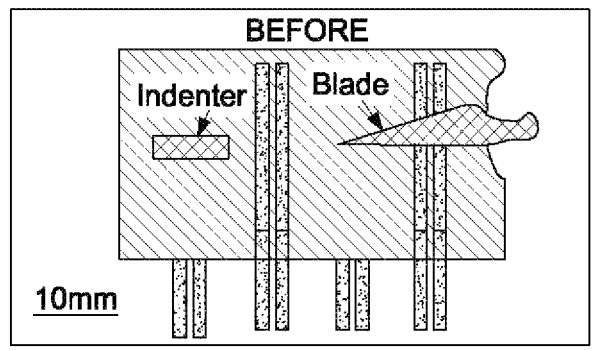
Figure 18C:
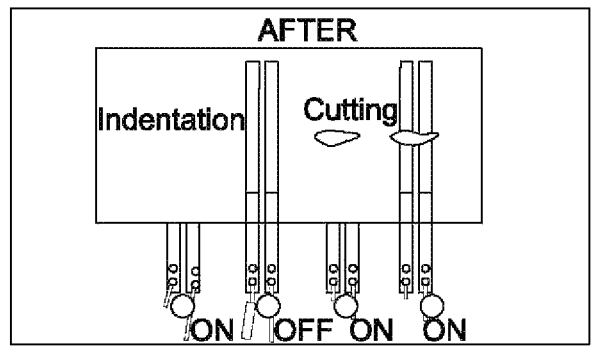

FIG. 18A shows damage selectivity architecture for liquid metal (LM) elastomer composite materials for autonomous damage detection according to the present invention. FIG. 18B shows the material before damage and FIG. 18C shows the material after indentation and cutting damage with selectivity where compression is sensed when only one LED is activated (•), and cutting when both are activated (•) demonstrating damage selectivity.

DETAILED DESCRIPTION

This disclosure generally describes damage sensing composite materials as well as methods of making and using the same. It is understood, however, that this disclosure also embraces numerous alternative features, aspects, and advantages that may be accomplished by combining any of the various features, aspects, and/or advantages described herein in any combination or sub-combination that one of ordinary skill in the art may find useful. Such combinations or sub-combinations are intended to be included within the scope of this disclosure. As such, the claims may be amended to recite any features, aspects, and advantages expressly or inherently described in, or otherwise expressly or inherently supported by, this disclosure. Further, any features, aspects, and advantages that may be present in the prior art may be affirmatively disclaimed. Accordingly, this disclosure may comprise, consist of, consist essentially or be characterized by one or more of the features, aspects, and advantages described herein. As used herein, the term "and/or" includes any and all combinations of one or more of the associated listed items.

All numerical quantities stated herein are approximate, unless stated otherwise. Accordingly, the term "about" may be inferred when not expressly stated. The numerical quantities disclosed herein are to be understood as not being strictly limited to the exact numerical values recited. Instead, unless stated otherwise, each numerical value stated herein is intended to mean both the recited value and a functionally equivalent range surrounding that value. At the very least, and not as an attempt to limit the application of the doctrine of equivalents to the scope of the claims, each numerical value should at least be construed in light of the number of reported significant digits and by applying ordinary rounding processes. Typical exemplary degrees of error may be within 20%, 10%, or 5% of a given value or range of values. Alternatively, and particularly in biological systems, the terms "about" refers to values within an order of magnitude, potentially within 5-fold or 2-fold of a given value. Notwithstanding the approximations of numerical quantities stated herein, the numerical quantities described in specific examples of actual measured values are reported as precisely as possible. Any numerical values, however, inherently contain certain errors necessarily resulting from the standard deviation found in their respective testing measurements.

All numerical ranges stated herein include all sub-ranges subsumed therein. For example, a range of "1 to 10" or "1-10" is intended to include all sub-ranges between and including the recited minimum value of 1 and the recited maximum value of 10 because the disclosed numerical ranges are continuous and include every value between the minimum and maximum values. Any maximum numerical limitation recited herein is intended to include all lower numerical limitations. Any minimum numerical limitation recited herein is intended to include all higher numerical limitations.

All compositional ranges stated herein are limited in total to and do not exceed 100 percent (e.g., volume percent or weight percent) in practice. When multiple components may be present in a composition, the sum of the maximum amounts of each component may exceed 100 percent, with the understanding that, and as those skilled in the art would readily understand, that the amounts of the components may be selected to achieve the maximum of 100 percent.

In the following description, certain details are set forth in order to provide a better understanding of various features, aspects, and advantages the invention. However, one skilled in the art will understand that these features, aspects, and advantages may be practiced without these details. In other instances, well-known structures, methods, and/or processes associated with methods of practicing the various features, aspects, and advantages may not be shown or described in detail to avoid unnecessarily obscuring descriptions of other details of the invention.

The terminology used herein is for the purpose of describing particular examples only and is not intended to be limiting. As used herein, the singular forms "a", "an", and "the" may be intended to include the plural forms as well, unless the context clearly indicates otherwise. The terms "comprises", "comprising", "including", "having", and "characterized by", are inclusive and therefore specify the presence of stated features, elements, compositions, steps, integers, operations, and/or components, but do not preclude the presence or addition of one or more other features, integers, steps, operations, elements, components, and/or groups thereof. Although these open-ended terms are to be understood as a non-restrictive term used to describe and claim various aspects set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, described herein also specifically includes embodiments consisting of, or consisting essentially of, such recited compositions, materials, components, elements, features, integers, operations, and/or process steps. In the case of "consisting of", the alternative embodiment excludes any additional compositions, materials, components, elements, features, integers, operations, and/or process steps, while in the case of "consisting essentially of", any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics may be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

Soft matter damage detection materials may be configured to integrate into soft, flexible, or rigid materials without contributing to mechanical stiffness and detect damage under extreme deformation. Soft matter damage detection materials may be useful for multifunctional and programmable materials or wearable sensors while being compatible with mature technologies like composite and metallic structures. Soft matter damage detection materials may be useful in the robotics domain. Over the past few decades robots have increasingly moved into more autonomous applications. Monitoring material and structural integrity and responding to damage in these systems may contribute to successful deployment and continued operation. These damage detection materials may be used for soft robotics. The high deformability and low mechanical stiffness allows integration into soft material structures, actuators, programmable matter, and artificial muscle systems incorporating multifunctionality into these systems.

Introduction

Soft materials that sense, actuate, and actively tune properties provide opportunities to create highly multifunctional materials. This allows for material systems that are highly deformable and mechanically tunable and robust across diverse length scales. The ability for functional materials to bend, stretch, and twist is typically accomplished by utilizing elastomeric substrates as a carrier for active materials. This approach maybe versatile and amendable to diverse materials including deterministically patterned metal wires or wavy circuitry, networks of conductive nanomaterials such as carbon nanotubes and graphene, and conductive and semi-conducting polymers. Non-toxic liquid metal alloys such as Galinstan or eutectic gallium indium (EGaIn) may be used for highly elastic circuitry, tunable antennas, and deformation sensors. The use of a conductive liquid combines the desirable electrical and thermal properties of metal with the deformability and softness of fluids, providing an intriguing option for multifunctional soft materials. Such materials may be useful for a variety of applications, including soft robotics and "artificial skin" electronics for bio-monitoring and human-machine interaction.

Advances in soft-matter engineering have enabled the development of highly integrated, multifunctional materials capable of autonomous operation. Such materials have the potential to mimic the rich properties of skin, nervous tissue, and muscle for applications ranging from soft robotics, and "artificial skin" electronics for physiological monitoring and human-machine interaction. As these materials move out of the lab and into real-world environments, it is becoming increasingly important to monitor material and structural health to detect flaws and the propagation of damage. This may be important as systems become more complex and performance becomes dependent on the function of individual soft matter components.

As the performance and complexity of these systems continues to increase, uninterrupted monitoring of the integrity of individual soft material components becomes increasingly important. This requires the ability to track material and structural health through the detection of damage and propagation of flaws and defects. In more conventional material systems, damage has traditionally been detected through a variety of non-destructive evaluation (NDE) techniques, which may include ultrasonics, X-radiography, Eddy currents, magnetic techniques, and visual inspection. However, these systems may be bulky and may have strict material requirements (i.e., Eddy current approaches only inspect conductive materials), and may be more suited for periodic monitoring of damage in large-scale systems. Conventional methods to detect damage may require power to detect damage, which may lead to an indeterminate expenditure of energy. In contrast, the present invention may be electrically passive and only react (activate and engage the supporting electronics) when damage occurs.

Conventional efforts have focused on more scalable methods based on thin-film approaches that utilize visual inspection or ultrasonic techniques. Examples include the use of dye penetrants or mechanically induced color change through the use of specific chemical functional groups that undergo mechanochemical reactions. Despite their promise for certain monitoring conditions, these techniques may result in a limited visual signal and may require controlled lighting conditions to increase reliability. Micro-capsule techniques may utilize enhanced contrast with permanent color change. However, while visual inspection may be suited for line of sight applications, it may be tedious and time consuming, and potentially unreliable, which limits its use in autonomous and deployable systems. Compact piezoelectric or resistive systems may be used to monitor damage remotely. However, these systems may be made of stiff (modulus >1 GPa) and relatively brittle (strain <10%) materials, such as lead-zirconate-titanate (PZT) or polyvinylidene difluoride (PVDF), making them incompatible with soft and highly deformable materials and structures.

Figure 1A:
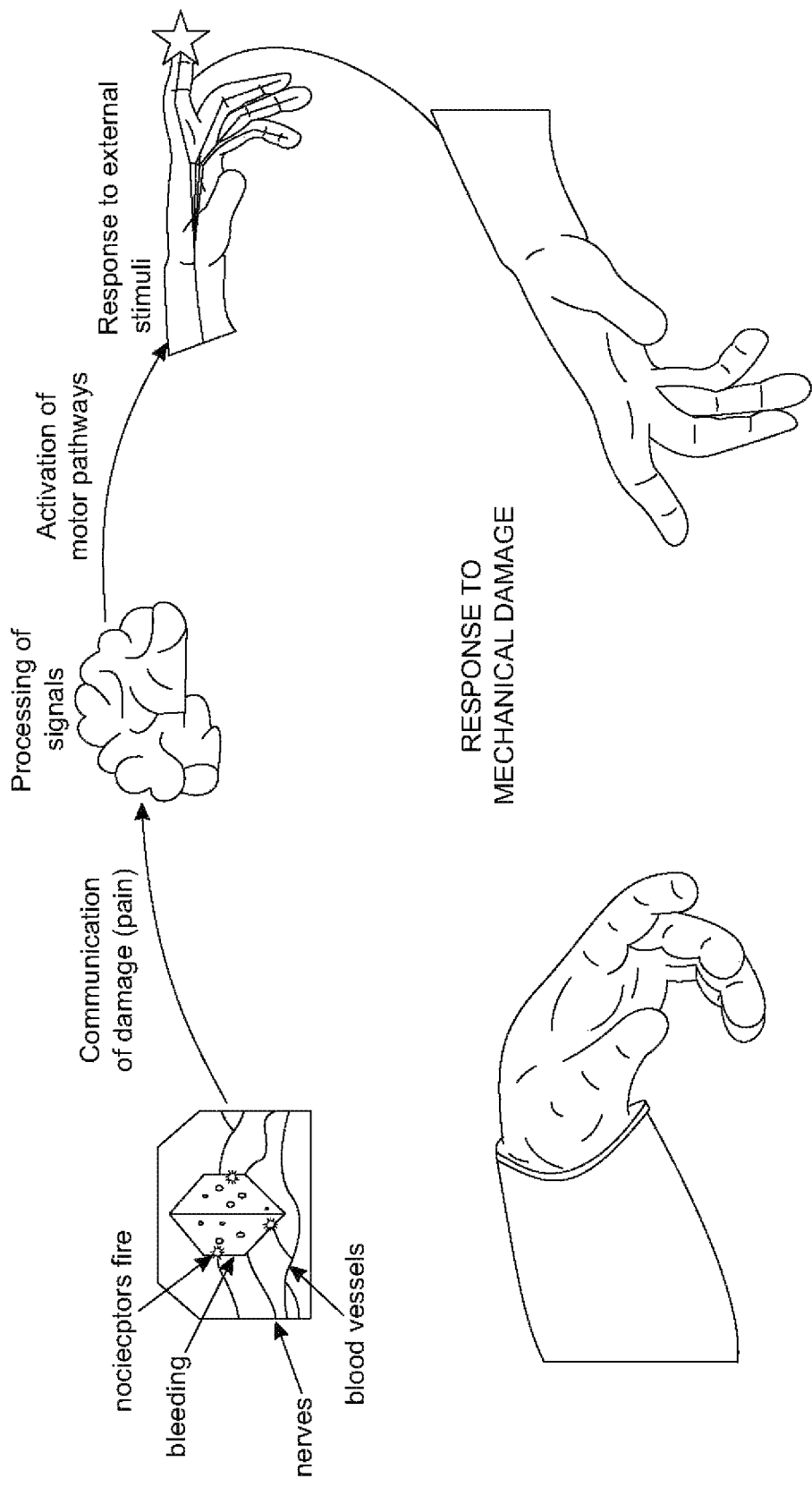
FIGS. 1A-D include liquid metal (LM) elastomer composite materials for autonomous damage detection according to the present invention.

In the case of soft material systems, damage detection architectures must be mechanically compatible with the host structure, which may generally require high compliance, flexibility, and/or stretchability. Human nervous tissue provides an example of a soft responsive material that is capable of detecting, communicating, and responding to harmful external stimuli (FIG. 1A). The detection of adverse stimuli is initiated from an extensive network of cutaneous and subcutaneous receptors called nociceptors. The nociceptors may be responsible for firing action potentials to directly relay this information to the cortex of the brain. The human body responds by activating motor pathways to move the endangered appendage away from the external stimuli. This interconnected response in biological systems may provide for a wide range of stimuli-responsive materials that adapt or respond to environmental changes including temperature, mechanical or physical, optical, and chemical. Bio-inspired soft materials that exhibit similar response and which also interface with existing technologies provide a path forward to enable intelligent, programmable interactions between external stimuli and dynamic material properties. Recently, autonomy has been incorporated in soft-matter systems through intelligent mechanical design with preplanned tasks and on-board actuation, power, and computation. While promising, these systems may lack the necessary hardware and sensing to provide critical runtime feedback to modify the preplanned task. Additionally, for wireless machines in remote areas, power consumption may benefit from being minimized. This may be critical for long-term remote monitoring of deployed systems to achieve system autonomy. The comprehensive system-level integration of components to enable soft-matter robotic materials to be fully self-aware of their current state still remains a significant challenge.

Figure 1B:
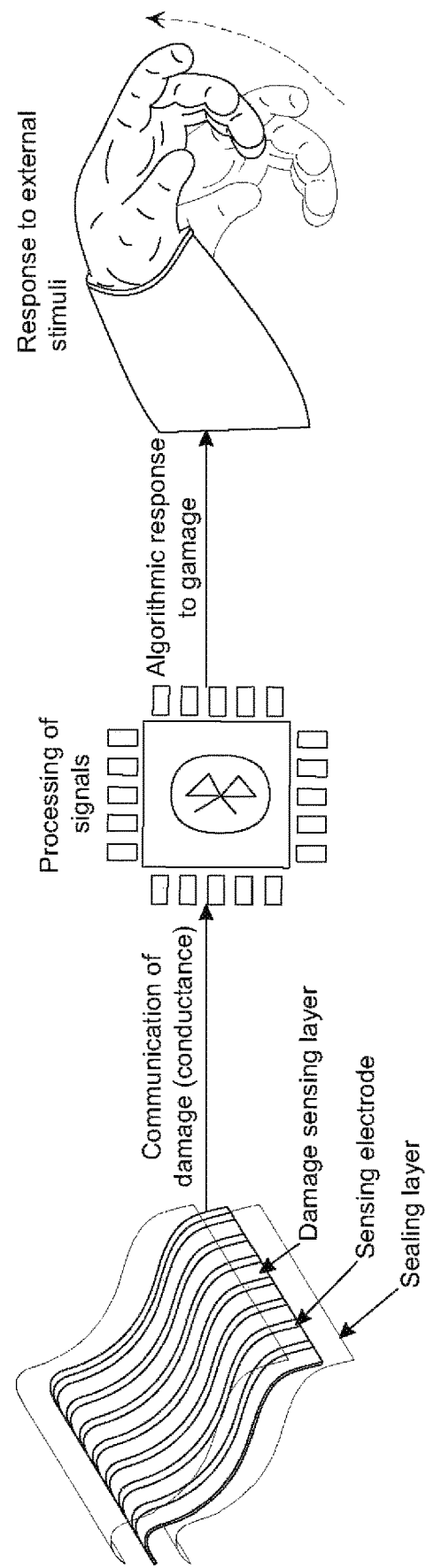

The present invention is directed to compliant, soft material architectures for "artificial nervous tissue" that incorporate LM elastomer composites and arrays of LM traces to enable active electrical detection and localization of multiple material damage events. The soft and elastically deformable "artificial nervous tissue" may detect and localize damage (FIG. 1B) by monitoring the formation of conductive areas from damage related events such as compression, fracture, and/or puncture. The artificial nervous tissue may comprise liquid metal (LM) microdroplets embedded within a soft silicone elastomer matrix. When damage occurs, LM microdroplets within the LMEE may rupture and cause in situ conductive pathways between neighboring droplets to form, which may be observed as a local change in electrical conductivity. To sense the local, discrete changes in electrical conductivity, a passive multiplexing technique may be used where a pair of electronic switches and a microcontroller is used to monitor the impedance between adjacent LM traces (FIG. 1C) or at each node for overlapping arrays (FIG. 4). By monitoring the formation, instead of destruction, of conductive networks, a large change in electrical signal may be observed resulting in a nearly digital response to damage. Furthermore, the independent properties of the LM-elastomer composite materials may allow the detection of multiple damage events along the same conductive LM trace in overlapping arrays. This may provide a path forward for achieving the longevity that is exhibited in natural, biological systems. The electrical communication of damage enables direct integration with existing electronic control systems, providing a method for soft-matter robotic systems to initiate an algorithmic response to reduce/prevent failure. Due to the initially open circuit architecture (naturally, electrically insulating), the damage detection scheme may utilize ultra-low currents to monitor the undamaged state, as power is not dissipated across a resistive medium.

Figure 1C:
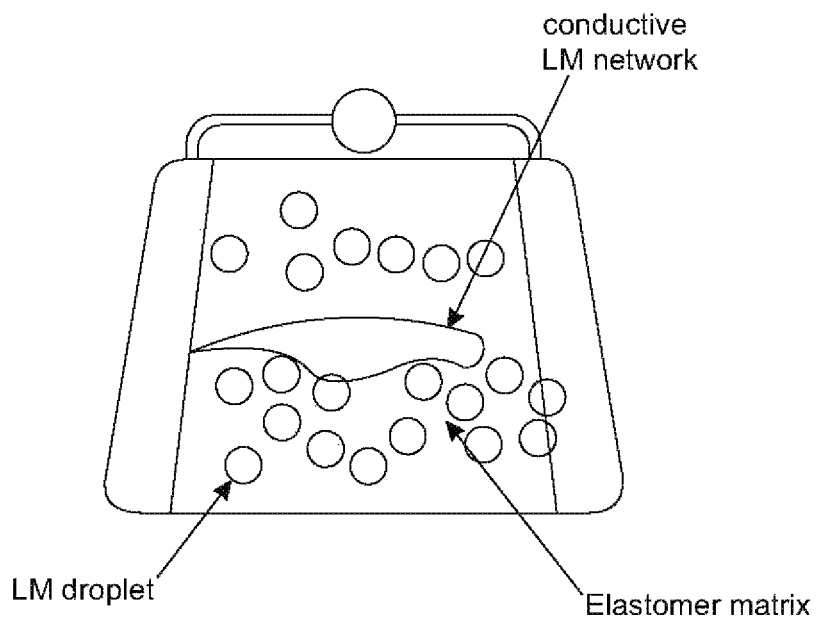
Figure 1D:
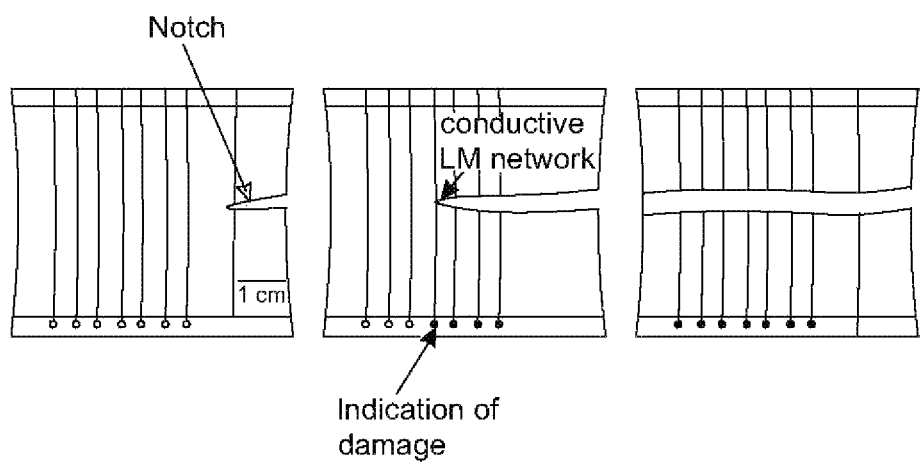
Figure 7:
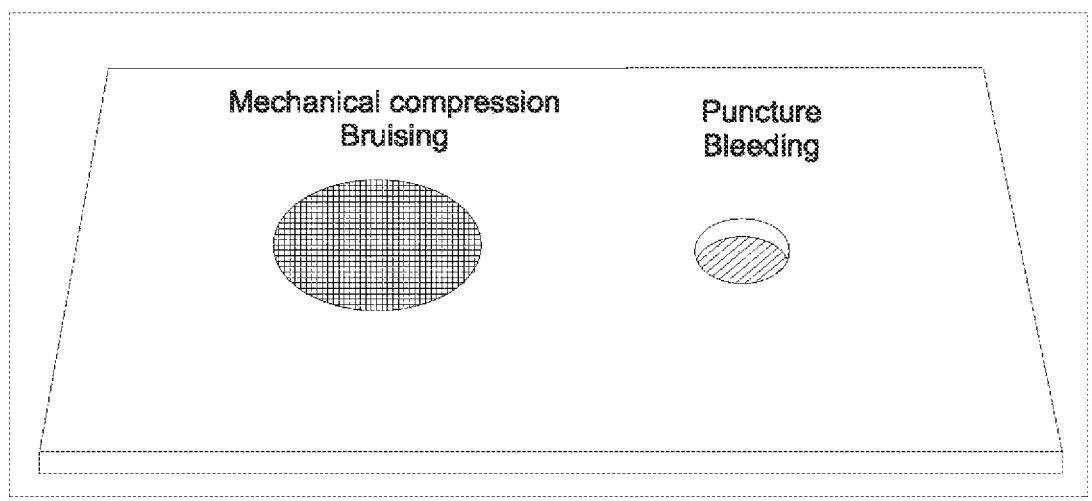
FIG. 7 shows changes in the optical properties after damage to liquid metal (LM) elastomer composite materials for autonomous damage detection according to the present invention. The LM-elastomer composite material bruises under compressive loads and bleeds when puncture occurs.

The underlying fluidic structures (LM micro-droplets) within the synthetic tissue rupture in response to mechanical damage-compression, fracture, and/or puncture (FIGS. 1C and 1D). Additionally, this internal fluidic response may be coupled with optical clues such as bruising or bleeding that occur depending on the severity of damage (FIG. 7). When the LM microdroplets rupture, in situ conductive pathways between neighboring droplets are formed. The damage-initiated change in electrical conductivity may be actively detected and localized, as indicated by the illumination of the LEDs as a notch propagates through the specimen (FIG. 1D). This material structure may provide a method for actively detecting and localizing damage within a soft-matter system to achieve the longevity exhibited in natural, biological systems. The electrical communication of damage may enable direct integration with existing control systems, providing a method for soft-matter robotic systems to initiate an algorithmic response to recover from a detrimental, external event. To demonstrate the ability to detect, communicate, and respond to a potentially detrimental event, material structure with an untethered, inflatable soft humanoid structure may be used, where multiple puncture events are rapidly detected, computed, and utilized in a control loop to prevent deflation and loss of functionality.

The composite material according to the present invention may comprise an elastomer embedded with a plurality of liquid metal inclusions. The elastomer may comprise polysiloxane (e.g., silicone, polydimethylsiloxane, RTV silicones), polyurethane, polyacrylate, natural (latex) rubber, block copolymer elastomers (e.g., styrene ethylene butylene styrene), thermoplastic elastomers (e.g., propylene-ethylene co-polymer), hydrogels, and other similar materials. The liquid metal may comprise eutectic gallium indium (EGaIn), gallium-indium-tin (Galinstan), Gallium, Indalloy, New-Merc, mercury, and other metals that are liquid at lower temperatures than other metals. The composite material may comprise a polymer sealing layer applied to the electrode. The polymer sealing layer may comprise polysiloxane (e.g., silicone, polydimethylsiloxane, RTV silicones), polyurethane, polyacrylate, natural (latex) rubber, block copolymer elastomers (e.g., styrene ethylene butylene styrene), thermoplastic elastomers (e.g., propylene-ethylene co-polymer), hydrogels, and other similar materials.

The droplets may comprise a diameter from 1 nanometer to 400 micrometers, such as having an upper limit of up to 1 micrometer, 10 micrometers, 25 micrometers, 50 micrometers, 75 micrometers, 100 micrometers, 150 micrometers, 200 micrometers, 250 micrometers, 300 micrometers, 350 micrometers, and 400 micrometers, and a lower limit of 1 nanometer, 10 nanometers, 25 nanometers, 50 nanometers, 75 nanometers, 100 nanometers, 250 nanometers, 500 nanometers, 750 nanometers, 1 micrometer, 10 micrometers, 25 micrometers, 50 micrometers, 75 micrometers, 100 micrometers, 150 micrometers, 200 micrometers, 250 micrometers, 300 micrometers, and 350 micrometers.

The composite material may be in electrical communication with a conductive material. For example, the LMEE may contact, be adjacent to, and/or be proximate to at least one electrically conductive array comprising a conductive material. The electrically conductive array may comprise an electrode. The electrically conductive array may be applied to a surface of the LMEE and/or the electrically conductive array may be applied to a surface of the substrate. The electrode may contact a surface of the LMEE. A first electrode may contact a first surface of the LMEE and a second electrode may contact a second surface of the LMEE. The first surface may be opposed to the second surface. The conductive material may include metals, electrolytes, superconductors, semiconductors, plasmas and/or nonmetallic conductors, such as graphite and conductive polymers. For example, the conductive material may comprise a solid metal and/or a liquid metal, as described above. The solid metal may comprise aluminum, copper, gold, and/or silver. The conductive polymers may include poly(fluorene)s, polyphenylenes, polypyrenes, polyazulenes, polynaphthalenes, poly(pyrrole)s (PPY), polycarbazoles, polyindoles, polyazepines, polyanilines (PANI), poly(thiophene)s (PT), poly(3,4-ethylenedioxythiophene) (PEDOT), poly(p-phenylene sulfide) (PPS), poly(acetylene)s (PAC), and poly(p-phenylene vinylene) (PPV).

The present invention is directed to devices comprising LM-based circuits with traditional electronic materials and components for increased functionality of flexible and stretchable circuits as well as methods of making and using the same. The combination of rigid electronics, flexible and stretchable electronics with deterministic geometries, and LM-based electronics on a single flexible circuit may provide the benefits and functionality of each system on a single device. Rigid electronic component may be used to provide functionalities (e.g., power management), sensing modalities (e.g., orientation, range, acceleration, magnetic field strength, speed, pressure, altitude, deformation, moisture/humidity, ambient sensing), communication modalities (e.g., radio frequency (RF), WiFi, BLUETOOTH), and/or on-board digital processing and storage of data. Flexible and stretchable electronics may provide soft and stretchable sensing (e.g., pressure, strain, tactile), communications (e.g., antennas), analog circuit elements (e.g., capacitors, resistors, inductors and diodes), and/or soft and stretchable interconnects (i.e., wiring) among the rigid and flexible elements to maintain electrical functionality under mechanical deformation (e.g., bending, twisting, stretching or compression).

The LMEE may be formed into a conductive polymer based device. The LMEE may be used as an electrically conducting material as part of a device. The LMEE may be used as part of an electrical circuit. The LMEE may be insulting or non-conductive when the liquid metal droplets are not ruptured and the LMCC may be conductive when at least a portion of the liquid metal droplets are ruptured to form the electrical circuit.

The LMEE may be used in an "artificial skin" or "electronic skin" which generally refer to artificial, polymer based skin mimics comprising the LMEE and one or more devices. A sensor comprising the LMEE may be in electrical communication with a controller and batteries that may be part of a system worn by a subject without the need for wires to connect to a separate off-body laptop/desktop/plug-in power supply, etc. Wireless communications may be used to transfer data from the sensor to the controller worn on the subject and a remotely located computer. The sensor may have an individual power, processer and transceiver components, or alternatively, a plurality of sensors may be connected (e.g., wired or wirelessly connected) to a single electronic device that is worn by the subject to provide power, processing and wireless data transmission for all sensors. The control signals sent to the sensor and data measured by the sensor may be wirelessly transmitted under software control on a computer and transmitted to a secure data storage site.

The artificial skin device may comprise at least one layer of an electrically conductive array comprising a network of liquid metal traces contacting an upper surface and/or lower surface of the polymer matrix comprising liquid metal droplets. The electrically conductive array may comprise at least one serpentine shaped liquid metal trace and/or at least one linear shaped liquid metal trace. For example, the artificial skin device may comprise two intersecting linear shaped liquid metal traces disposed on the surface of the substrate and contacting the bottom surface of the polymer matrix and two intersecting linear shaped liquid metal traces disposed on the surface of the polymer matrix. In other words, the artificial skin device may comprise a "layer-by-layer" construct comprising alternating layers of electrically conductive arrays of liquid metal traces and the polymer matrix comprising the liquid metal droplets therebetween. The intersecting linear shaped liquid metal traces may intersect at an angle of from greater than zero degrees to less than 180 degrees. For the example, the liquid metal traces may intersect at 90 degrees (i.e., orthogonal to each other). In another example, the liquid metal traces may be serpentine shaped arranged in concentric layers.

The LMEE may be adapted and configured to operate as a sensor capable of detecting and/or quantifying at least one stimulus selected from the group consisting temperature, fluid flow rate, moisture, ambient pressure, tactile pressure, force, surface stress, tearing, rupturing, puncturing, ripping, cutting, strain and magnetic field. For example, the artificial skin device may comprise an array of tactile pressure sensors arranged to form a shape sensing array capable of distinguishing depths and shapes of damage/ruptures to the LMEE.

The artificial skin device may comprise a coating comprising three layers applied to a surface of a substrate. The first layer may comprise an electrically conductive array of liquid metal traces disposed on the surface of the substrate, the second layer may comprise a liquid metal embedded elastomer disposed on the first layer array, and the third layer may comprise an electrically conductive array disposed on the surface of the LMEE. Each electrically conductive array may comprise a liquid metal trace oriented at a 90 degree angle in relation to a second liquid metal trace.

The coating may have a thickness of 1 micrometer to 10 mm, such as having an upper limit up to 10 mm, up to 5 mm, up to 1 mm, up to 100 micrometers, up to 50 micrometers, up to 25 micrometers, up to 10 micrometers, and a lower limit of at least 1 micrometer, 10 micrometers, 25 micrometers, 50 micrometers, 100 micrometers, 1 mm, 5 mm, and less than 10 mm.

The substrate may be rigid and/or flexible. The substrate may comprise plastic (rigid and/or flexible) metal, fabric, ceramic and/or glass substrates. The fabric substrate may comprise at least one of a gauze, a wipe, a bandage, a pad, a pledget, a sponge, and a mesh. The substrate may be removable from the LMEE. For example, the substrate may comprise an insulating material, such as rubber, that may be removed from the LMEE and the LMEE may be applied to another substrate, e.g., a garment.

EXAMPLES

The liquid metal (LM) embedded elastomer composites according to the present invention as well as methods of making and using the same described herein may be better understood when read in conjunction with the following representative examples. The following examples are included for purposes of illustration and not limitation.

Example 1

Liquid metal droplets dispersed in elastomeric systems according to the present invention may be engineered to exhibit a wide range of material properties, including extreme toughening exceptional electrical and thermal properties, selective sintering for electrical trace formation, and the ability to form electrically conductive pathways through controlled mechanical pressure or laser patterning that autonomously form new conductive pathways when the material is torn, punctured, or removed. Electrical conductivity is only possible with certain compositions and requires extreme pressure or stretch in order to rupture the embedded LM droplets and induce percolation. Electrical percolation is induced by large internal tensile stress concentrations that form around the LM inclusions. Upon application of sufficient pressure, the thin elastomer layer between inclusions ruptures, leading to the in situ flow of LM and formation of percolating electrical networks. The LMEE material architecture may be engineered by varying the stiffness of the elastomer matrix to influence the response of LMEEs to mechanical loading and damage. Electrical conductivity is observed to generally increase with volume loading of LM. The composite with the highest electrical conductivity ($\varphi$=50%) is incorporated into a soft materials architecture that electrically registers the occurrence and location of mechanical damage caused by compression, fracture, or puncture (FIG. 1C, 1D). When damaged, LM microdroplets within the LMEE will rupture and cause in situ conductive pathways between neighboring droplets to form (FIG. 1D). The damage-initiated change in electrical conductivity enables mechanical damage to be actively detected and localized, as indicated by the illumination of the LEDs as a notch propagates through the specimen (FIG. 1C). The fracture process zone experiences high local strains that result in the formation of an internal percolating network and local change in the electrical conductivity. Because this process zone extends beyond the immediate boundaries of a tear, we observe that the LEDs are illuminated before the notch reaches the conductive trace. Additionally, the internal LM percolation associated with this response may be coupled with optical cues that are analogous to skin bruising. Compared to other multi-point methods such as electrical impedance tomography that monitor the loss in conductivity, or increase in resistance, across a film, the damage detection material according to the present invention uses lower currents to monitor the undamaged state, due to the initially open circuit architecture (naturally, electrically insulating).

Figure 2A:
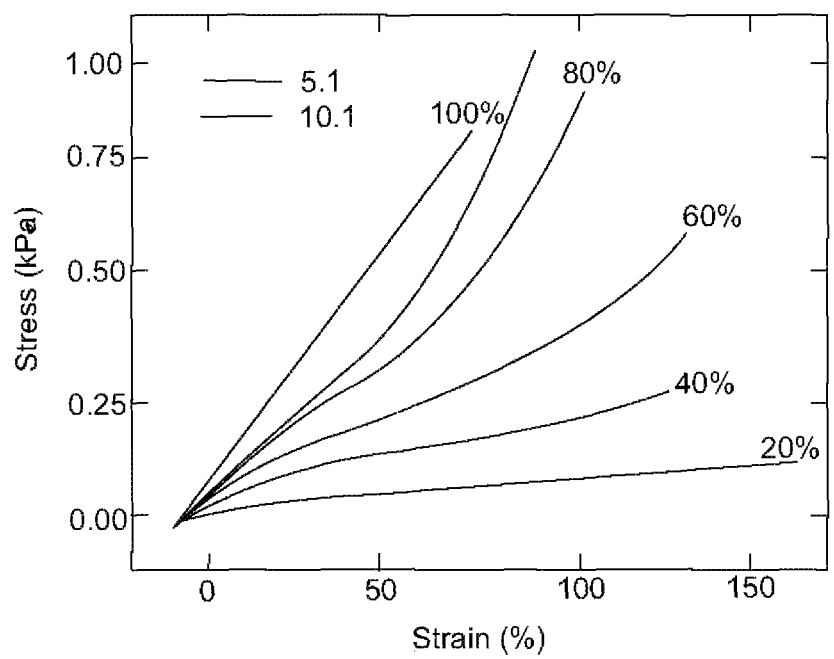
FIGS. 2A-F show mechanical and electrical characterization of liquid metal (LM) elastomer composite materials for autonomous damage detection according to the present invention.
Figure 2B:
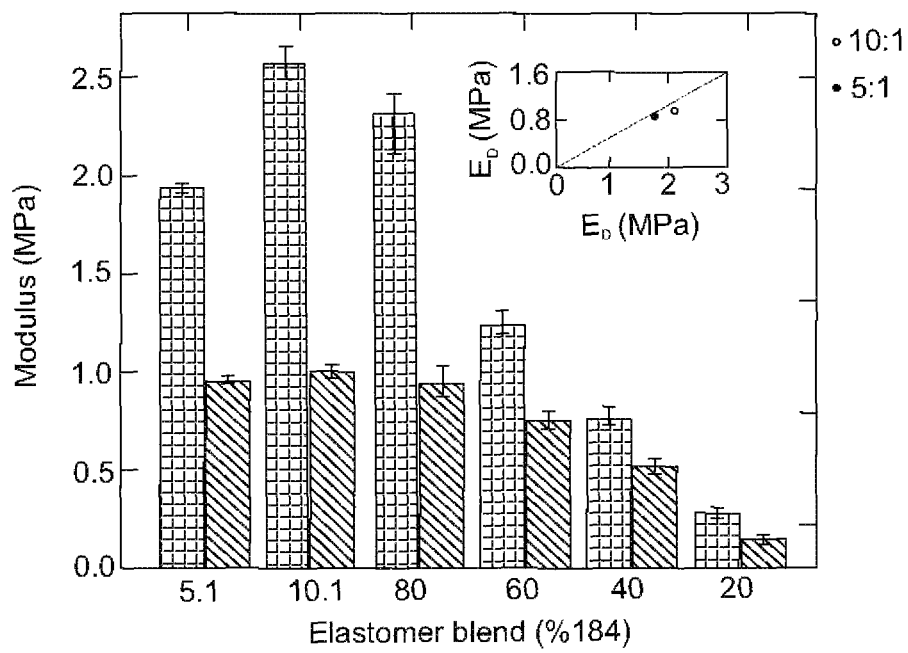
Figure 2C:
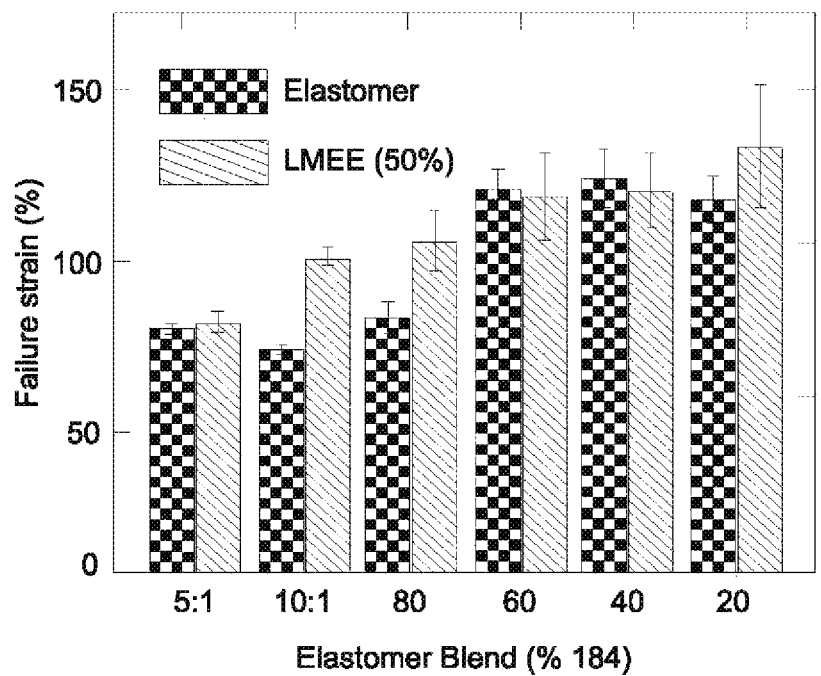
Figure 2D:
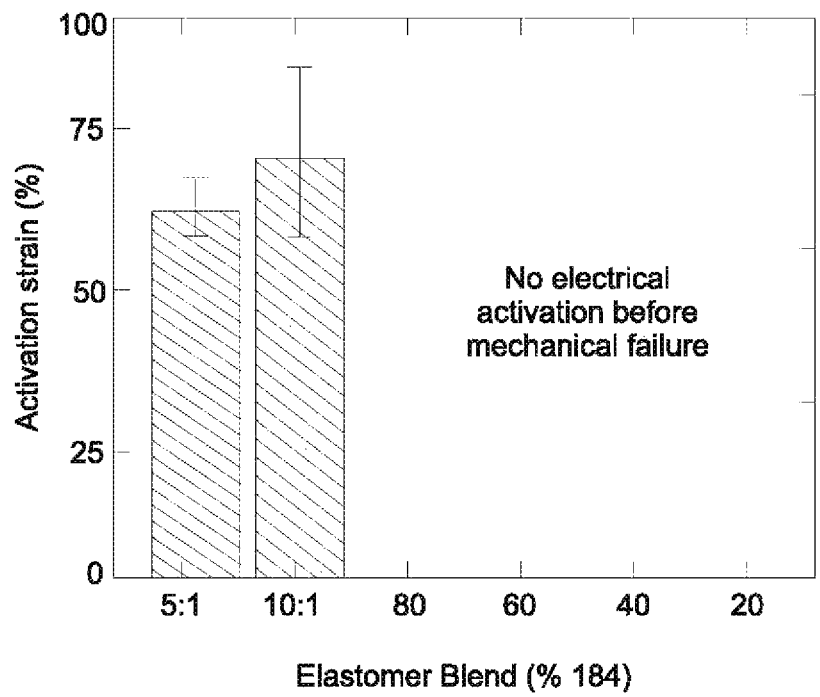
Figure 8:
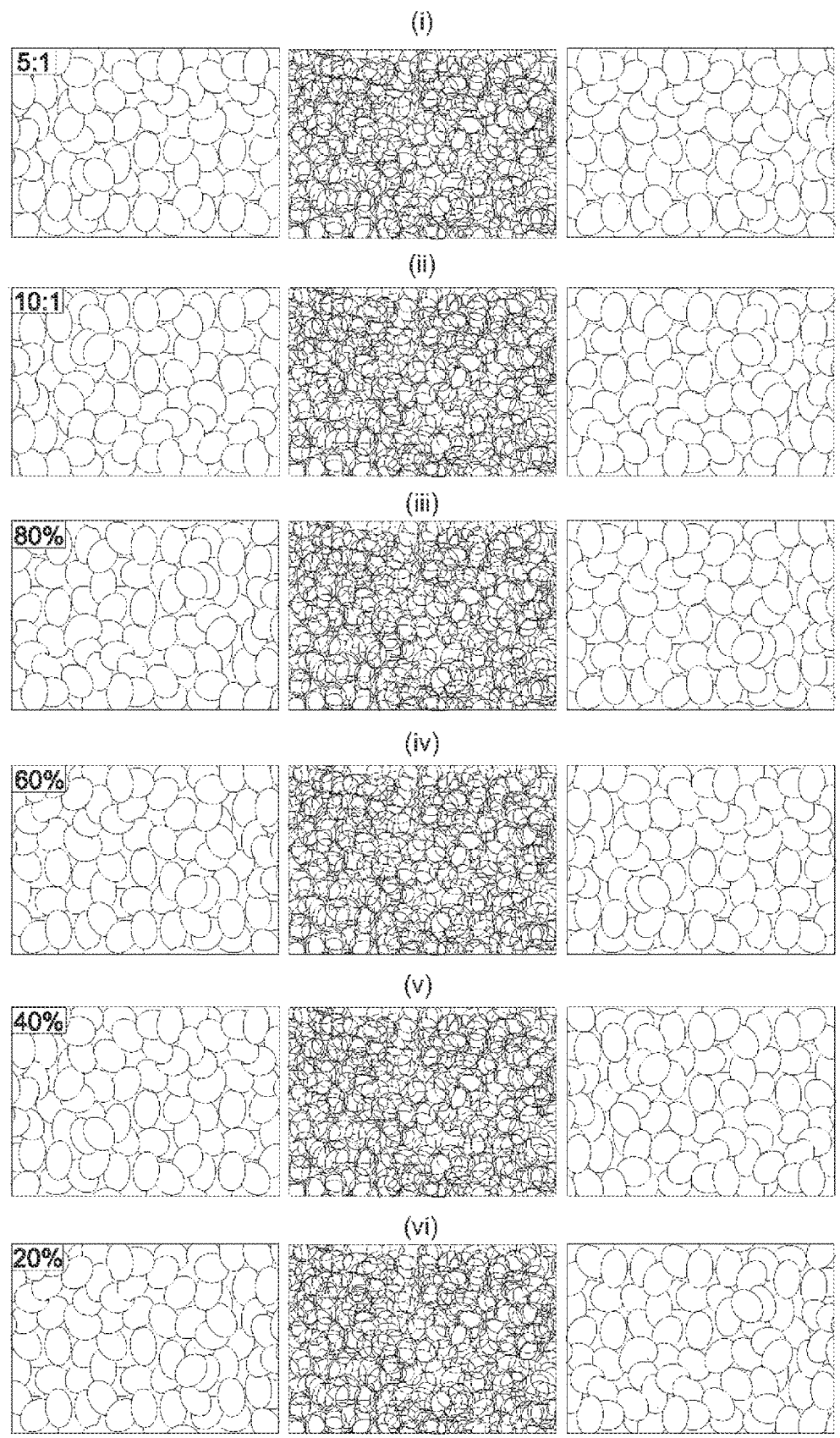
FIG. 8 shows article analysis of LM elastomer composite materials according to the present invention for $\varnothing=50\%$ and two oligomer/curing agent ratios (5:1, 10:1; $\alpha=100\%$) and four different blends of Sylgard 184 and Sylgard 527 ($\alpha=80, 60, 40, 20\%$). Column 1 shows optical micrographs of the composites. The scale bar is 100 µm. Column 2 shows thresholded image. Column 3 shows ellipses fit to the particles in the thresholded image overlaid on the optical micrographs. The size of the analyzed area is 800×600 µm$^2$ and particles having area <500 µm$^2$ are excluded.
Figure 9A:
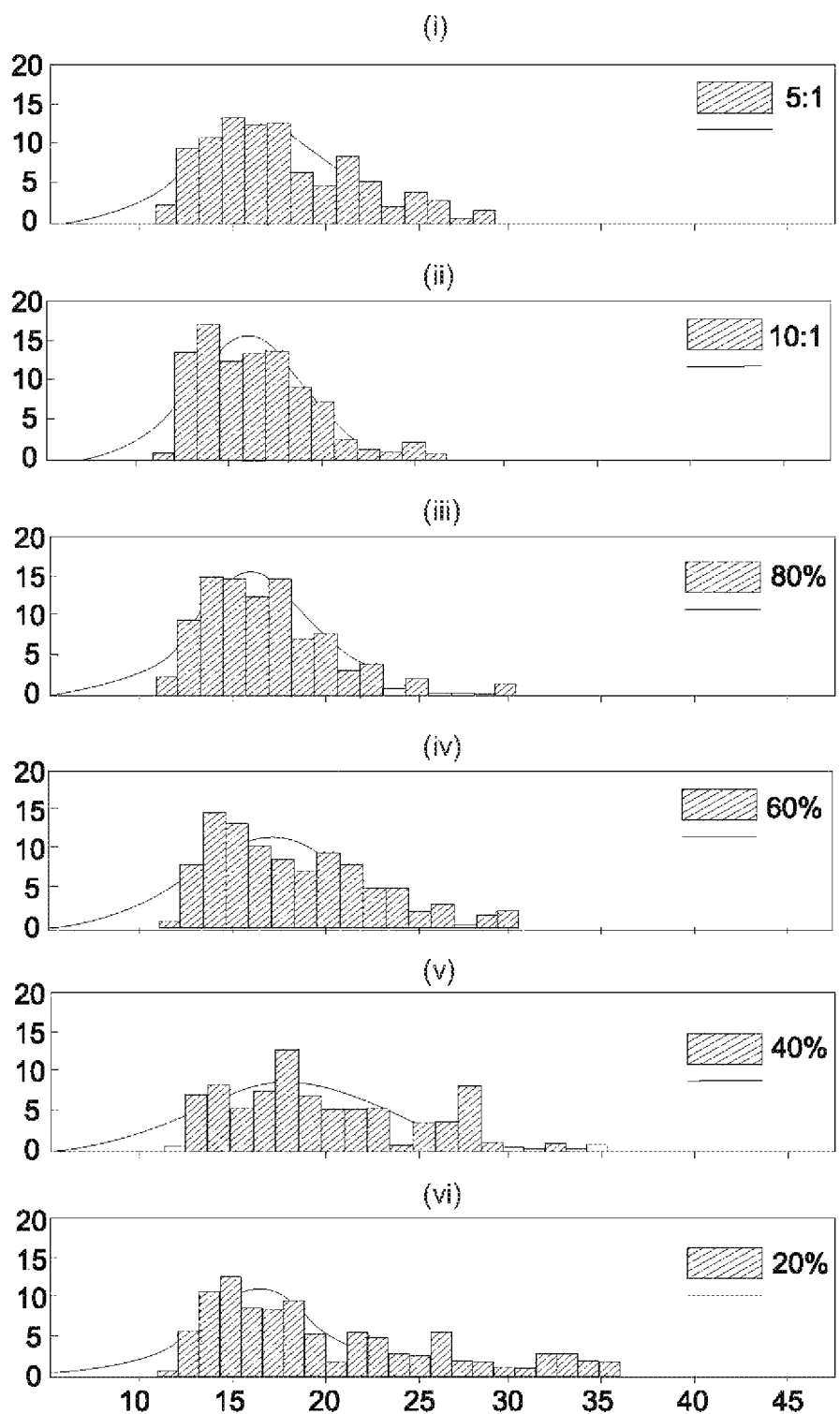
FIGS. 9A and 9B shows particle analysis histograms for liquid metal (LM) elastomer composite materials for autonomous damage detection according to the present invention.
Figure 9B:
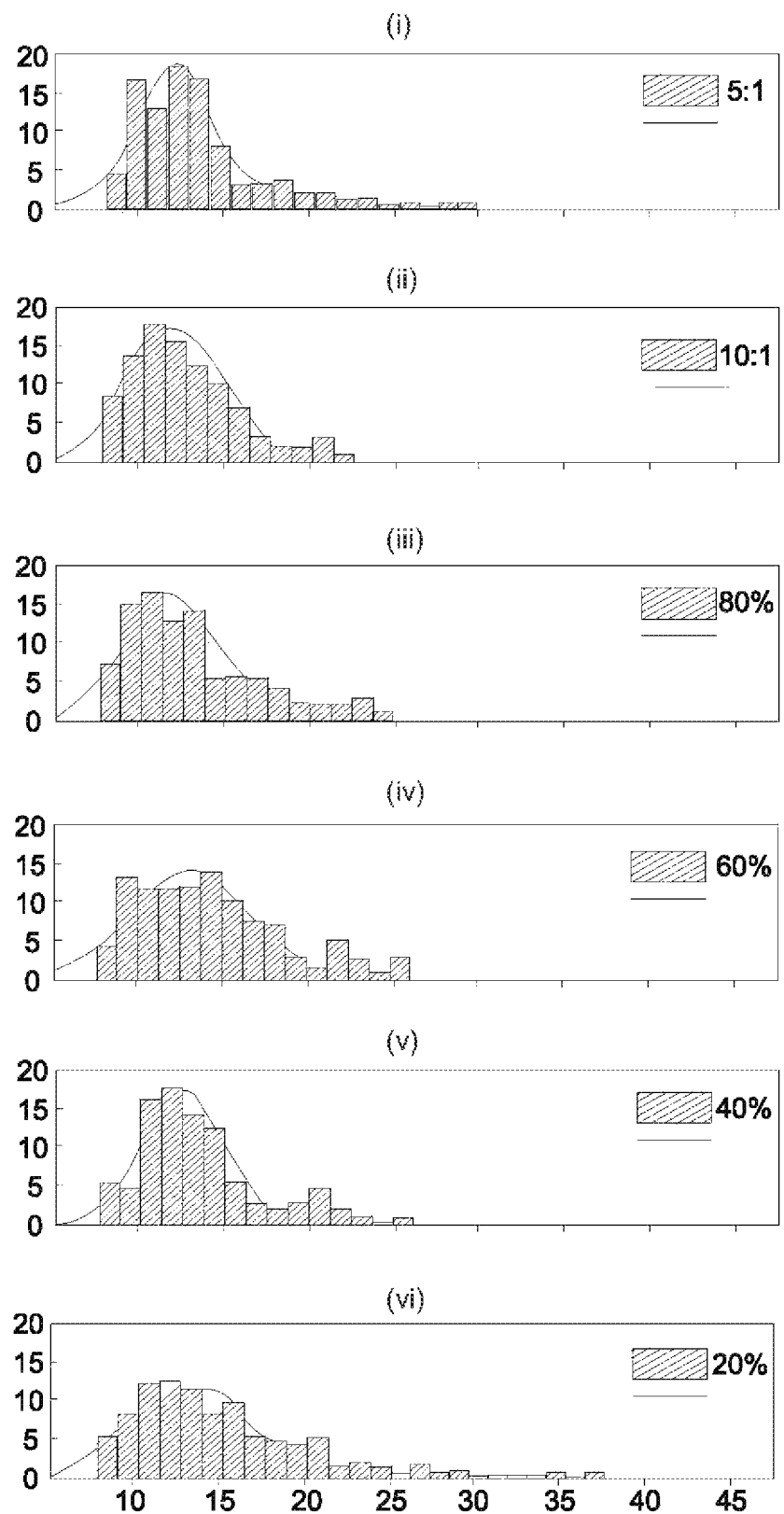

Mechanical characterization. The damage detecting material systems using an LMEE material architecture, where Ga-based LM is shear mixed with uncured silicone elastomer at a 1:1 volume ratio, forming a suspension of LM microdroplets (about 45 μm particles, FIGS. 7 and 8). Eutectic gallium-indium (comprising 75% Ga, 25% In; EGaIn) is selected as the LM filler due to its favorable properties including high electrical conductivity, low viscosity, low melting point, and negligible toxicity (as compared to Hg). In the presence of oxygen, the LM forms an insulating oxide skin about 0.5-3 nm thick that provides significant stress shielding from unintended activation over other droplet film type architectures. The elastomer blend of Sylgard 184 and Sylgard 527 is used to tailor the mechanical characteristics of the solid-liquid hybrid composite and its sensitivity to mechanical damage. The mechanical behavior of the LM-elastomer composite ($\varphi$=50%) is studied under tensile loading for two oligomer/curing agent ratios (5:1, 10:1; $\alpha$=100%) and four different blends of Sylgard 184 and Sylgard 527 ($\alpha$=80, 60, 40, 20%, where a is the ratio of Sylgard 184 to Sylgard 527). FIG. 2A shows the stress-strain curves for the different LM-elastomer composites. From this data, the influence of the liquid inclusions is studied by measuring the tensile modulus of the filled, Ec, and unfilled, Ee, elastomer. FIG. 2B shows that the LM inclusions soften the compliant-matrix. These results generally agree with Eshelby's inclusion theory, $E_c=E_e/(1+5\varphi/3)$, assuming incompressible fluidic inclusions ($E_i$=0 Pa). Referring to FIG. 2b (inset), both the experimental results and theory suggest an approximately 50% decrease in the stiffness with the addition of LM inclusions ($\varphi$=50%). As shown in FIG. 2C, the elastic strain limit of the elastomer and composite generally increases with increasing compliance. While, the LM inclusions have a negligible influence on the strain limit of the elastomer composite, they may significantly increase the toughness of the host elastomer by resisting fracture propagation. Furthermore, when used as a coating, the LM composite has a negligible influence on the stress-strain response of Nylon fabric (FIG. 2D). The LM inclusions increase the compliance of the soft, silicone rubber, while maintaining the elastic strain limit. This desirable combination of properties is uniquely enabled by the inclusion of liquid metal droplets, which preserve the properties of the host material and enable electronic damage detection and localization.

Figure 2E:
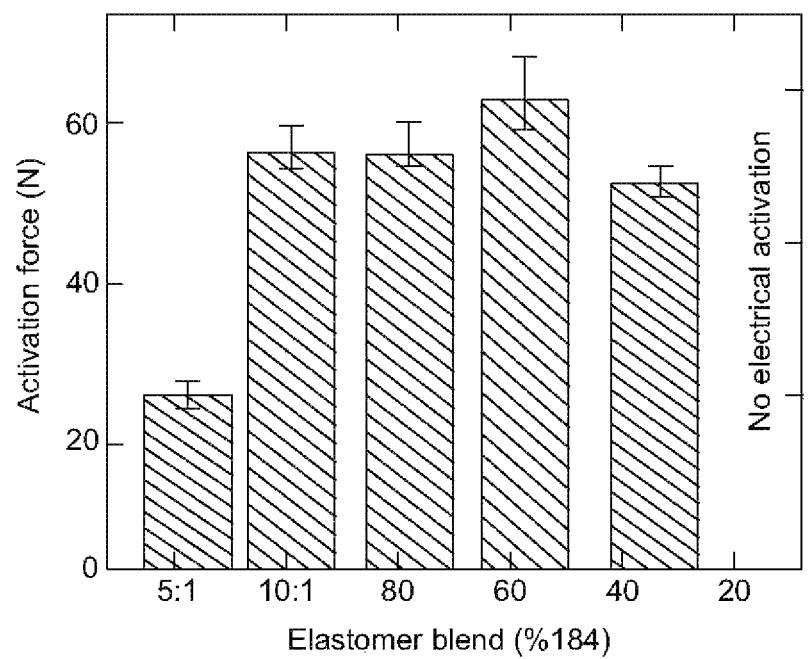
Figure 3A:
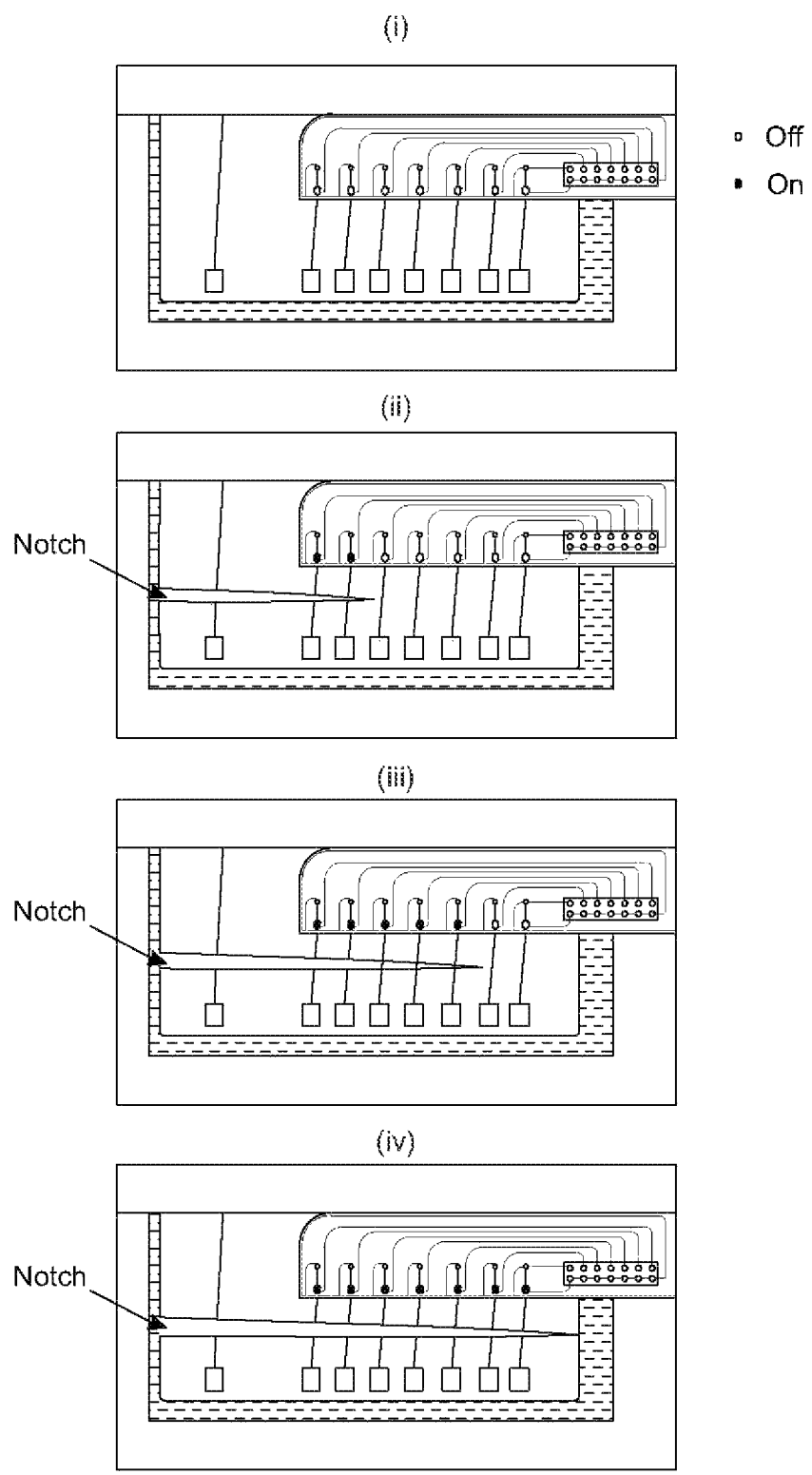
FIGS. 3A-C show damage detection substrate versatility for liquid metal (LM) elastomer composite materials for autonomous damage detection according to the present invention.
Figure 10:
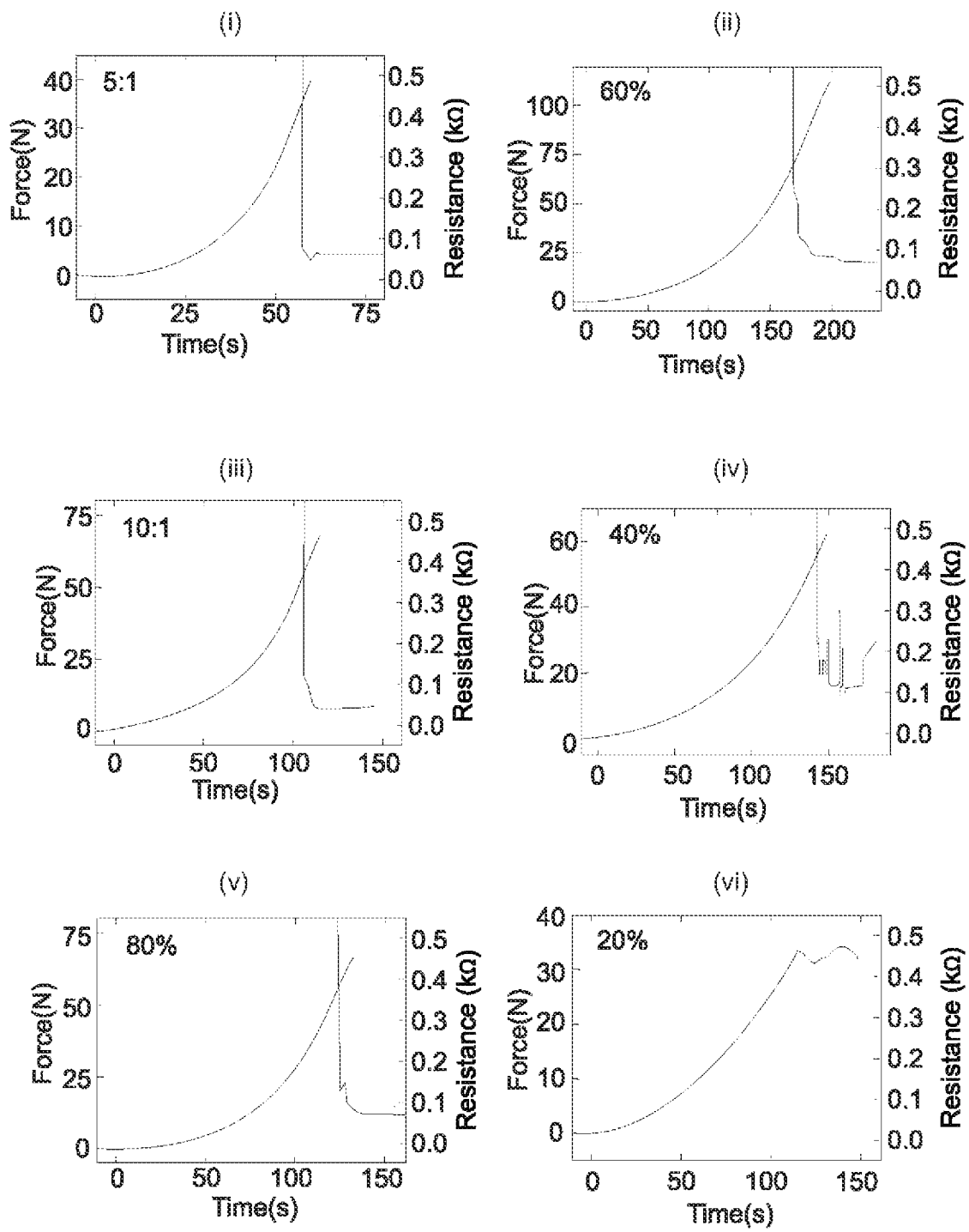
FIG. 10 shows compressive activation force and electrical network formation. Applied compressive (black) and resistance between adjacent traces (gray) as a function of time.

Formation of electrical networks. The LM-elastomer composite is (naturally) electrically insulating after curing due the presence of an insulating oxide skin and lack of droplet-droplet contact (or percolating networks). However, the application of local pressure or various modes of mechanical damage (e.g., cutting, puncture, large strain deformation) may cause the LM inclusions to rupture, forming a conductive percolating network (conductance between two adjacent traces, G>0.003 S) that is internal to the composite with a minimum thickness of about 200 micrometers. The damage initiated change in electrical conductivity for the different elastomer blends and various modes of mechanical damage is described. First, the electrical conductivity is monitored between two conductive tabs of a dogbone specimen under uniaxial deformation. As shown in FIG. 2D, only the Sylgard 184 specimens ($\alpha$=100%) formed an electrical network before mechanical failure occurs. The composite is then subjected to mechanical compression. A glass cylindrical indenter (about 3 mm diameter, about 10 mm length) is pressed into the composite across two conductive traces until an electrical network is formed. As shown in FIG. 2E, a large compressive force causes an internal, percolating electrical network to form. The softer LM-elastomer composites either did not form an electrical network under compression ($\alpha$=20%) or only achieved intermittent activation (6 of 12, $\alpha$=40%) that is typically not permanent (FIG. 10). To differentiate between compression and puncture, the $\alpha$=20% composite are combined with a $\alpha\geq60\%$ composite. When puncture occurs, both composites are activated. When concentrated compression occurs, only the $\alpha\geq60\%$ composite is activated. Lastly, the elastomer blend composites form an electrical network when cut with a precision knife. FIG. 3A shows the formation of a permanent electrical network as indicated by the illumination of the LEDs (•) as the knife passes through the material. During puncture events, such as cutting, the LM droplets on the damaged surface are severed in addition to the formation of an internal percolating network (FIG. 3A inset). In the presence of oxygen, an oxide skin is formed on the exposed LM, preventing unwanted flow of LM. The composite is stable under typical operational conditions and the mechanical properties of the composite may be tuned without increasing the overall thickness of the device to achieve damage initiated conductivity only when puncture occurs.

Figure 2F:
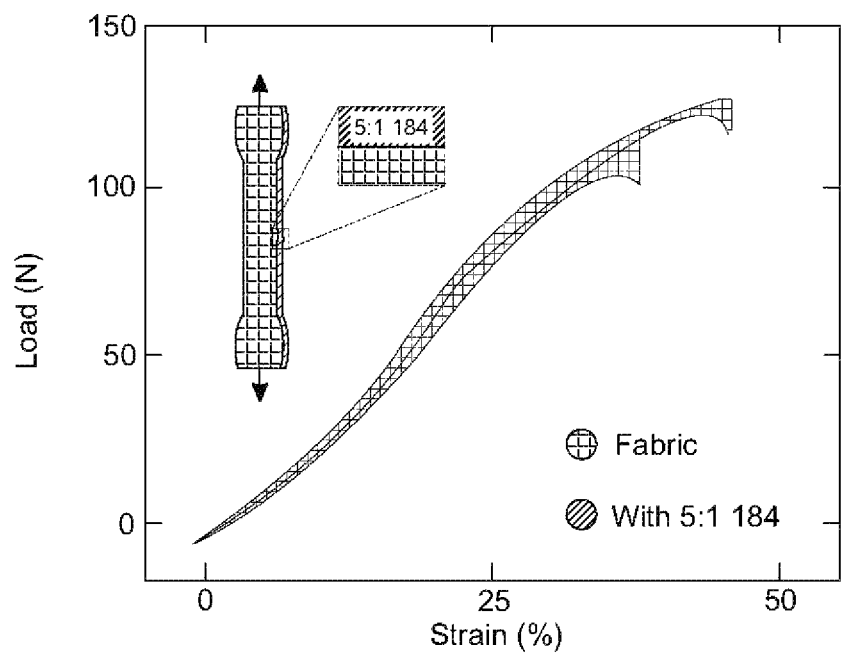
Figure 3B:
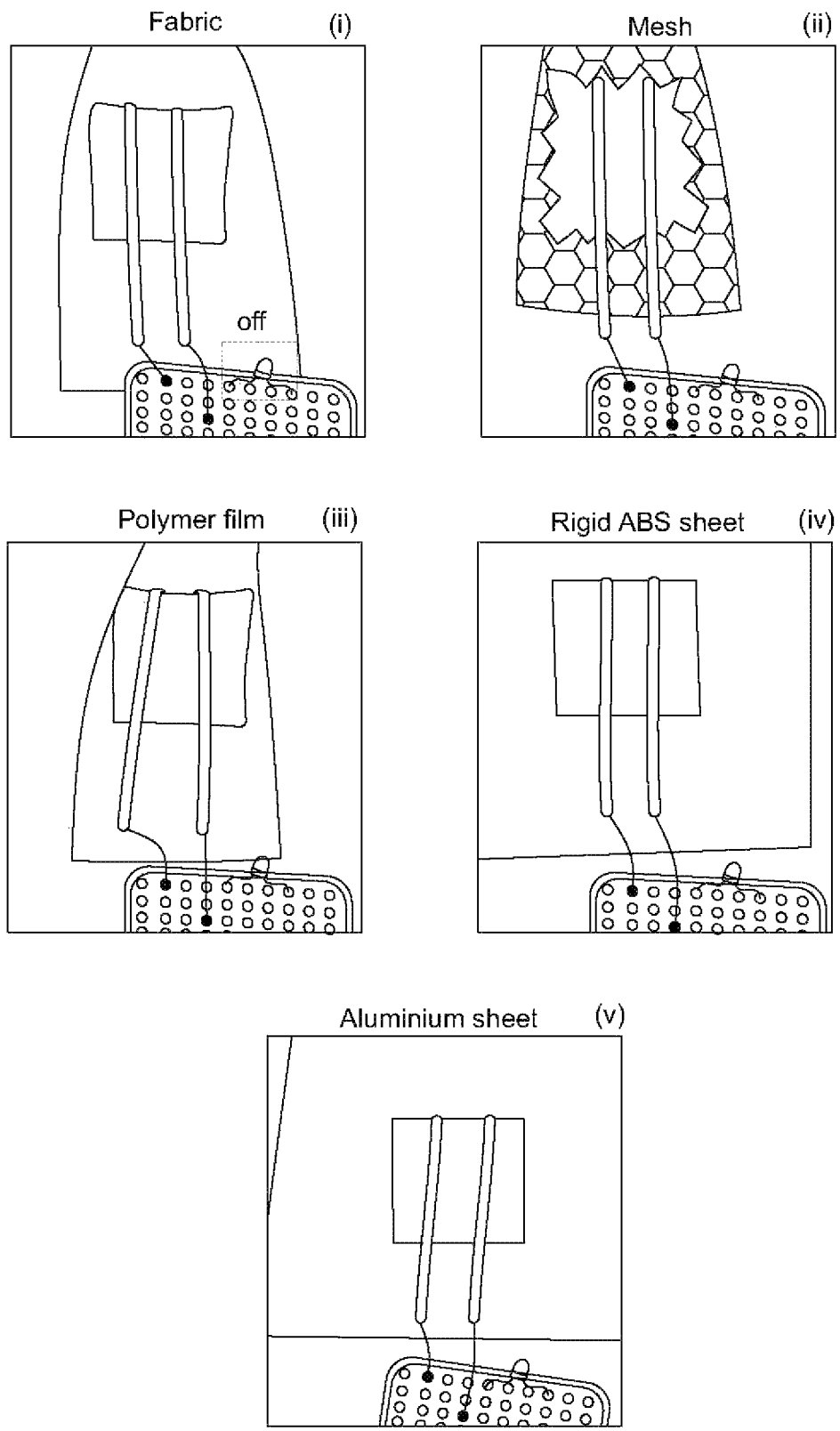
Figure 3C:
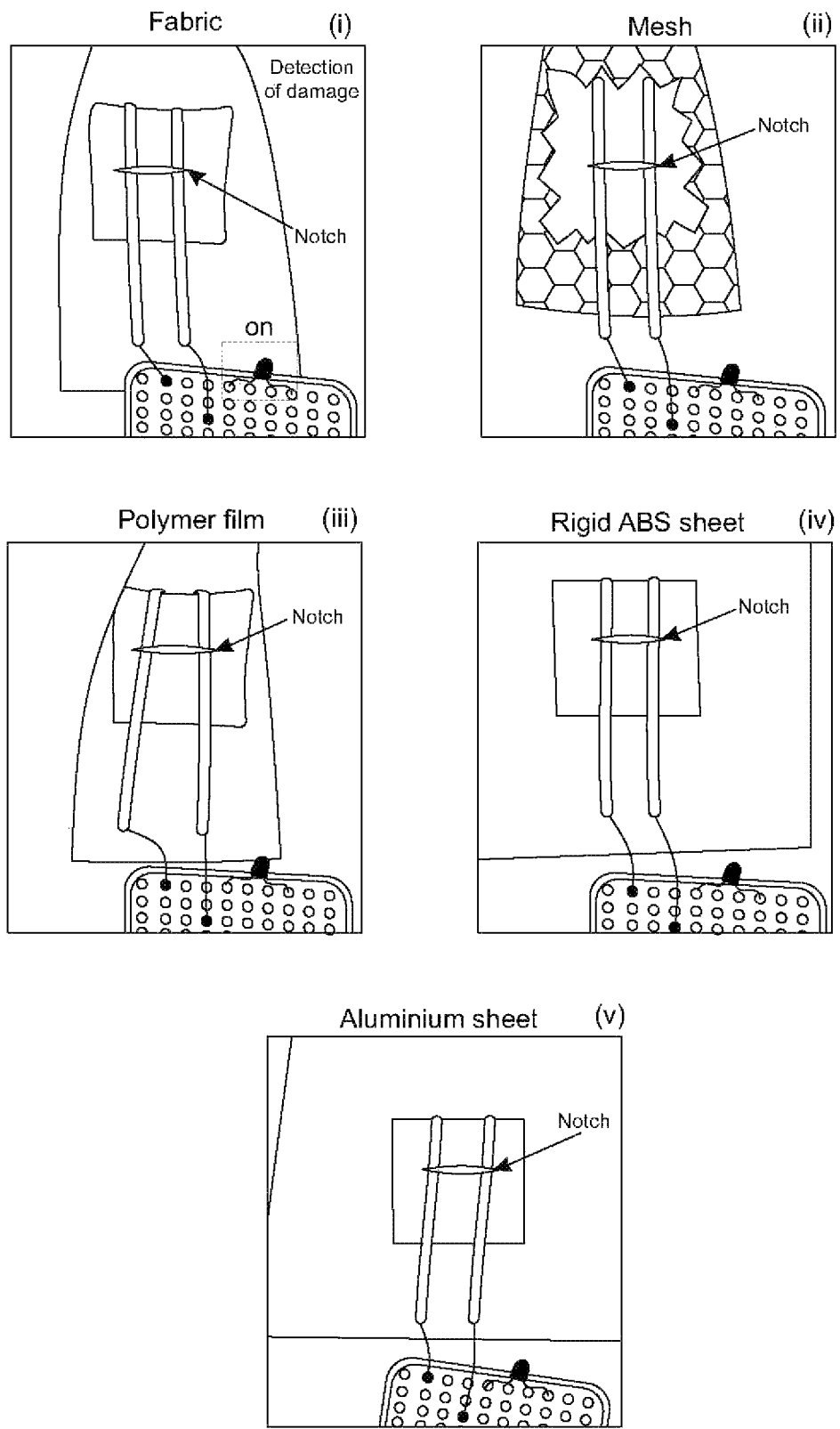

Integration with host substrates. To demonstrate the ability to integrate the active damage layer with existing structures, the composite is coated on a variety of commonly used materials including fabric (nylon, polyester), plastic (polyethylene terephthalate (PET), acrylonitrile butadiene styrene (ABS)), and metal (aluminum). As shown in FIG. 3B, the composite may be directly coated and cured on a variety of materials or attached using a silicone glue (Sil-poxy, Smooth-On). When coated on flexible substrates (fabric, thin plastic film), the soft and highly compliant LM-elastomer composite is electrically stable and does not restrict the general kinematic motion of the flexible substrate (FIG. 3B). Furthermore, the composite has a negligible influence on the stress-strain response of Nylon fabric (FIG. 2F). Additionally, when used as a coating, the LM-elastomer composite is able to detect damage as indicated by the illuminated LED (FIG. 3C), which is similar to the results shown in FIG. 1 for the free-standing elastomer. These results demonstrate that the composite may be used as a coating to detect damage on a variety of substrates, ranging from flexible to rigid, polymeric to metallic, and porous to continuous.

Figure 4A:
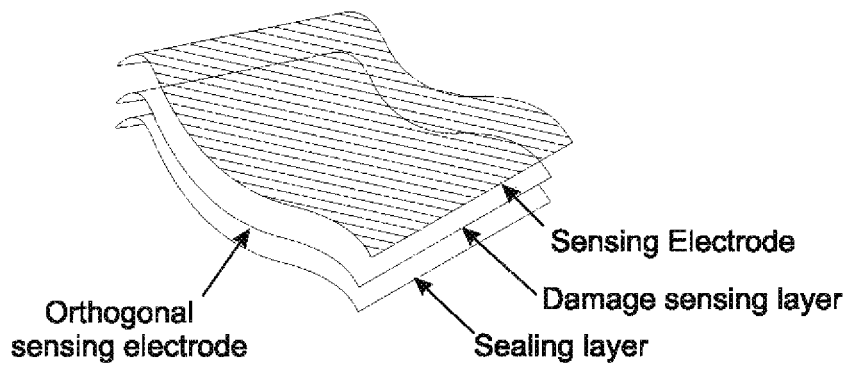
FIGS. 4A-E show damage detection and two dimensional (2D) localization for liquid metal (LM) elastomer composite materials for autonomous damage detection according to the present invention.
Figure 4B:
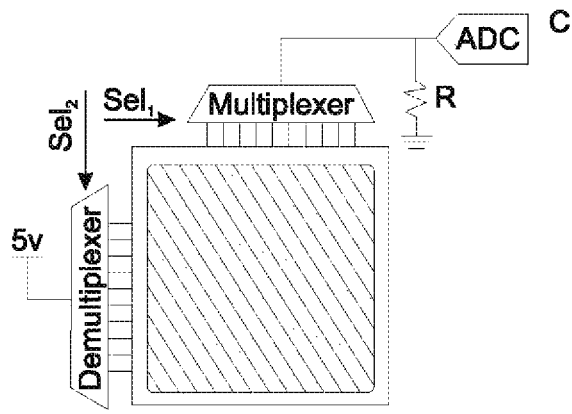
Figure 4C:
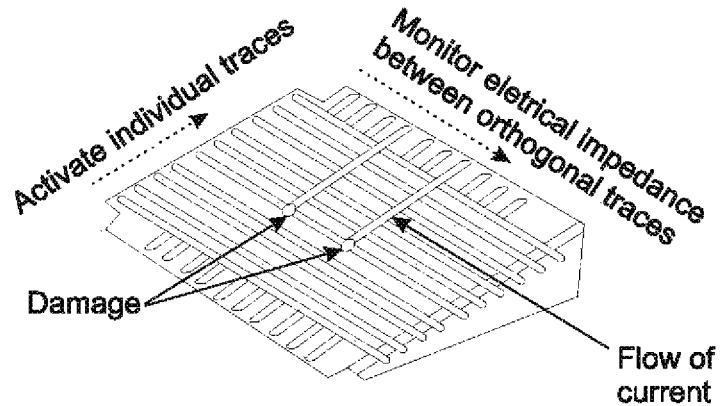

Detection and localization of damage. The LM-elastomer composite reports changes in structural health through local changes in electrical conductivity. To detect the local, discrete changes in electrical conductivity, a passive multiplexing technique is used to monitor the impedance between adjacent LM traces (5 mm center-to-center spacing) in 1D samples (FIGS. 1D, 2G) or at each node, or crossing, of the overlapping arrays in 2D samples (FIG. 4A). The highly deformable LM traces are spray deposited onto the LMEE composite (sensing layer) and sealed in a thin elastomer layer (t=0.5 mm) to prevent smearing. For 2D detection and localization, a second array is spray deposited on the opposite side, forming a 10×10 active-matrix grid to monitor through-thickness conductivity (FIG. 4A). A pair of electronic switches and microcontroller with an analog to digital converter (ATmega 328, Atmel) is used to monitor the impedance at each of the nodes, or crossings, within the grid (FIG. 4B). First, as shown in FIG. 4C, the demultiplexing switch applies a voltage potential to an individual trace. The multiplexing switch then scans all the orthogonal traces. When a voltage is sensed on an orthogonal trace, damage has occurred at the intersection of the two traces, as illustrated in FIG. 4C. The demultiplexing is then indexed to the next trace and the orthogonal traces are scanned again.

Figure 4D:
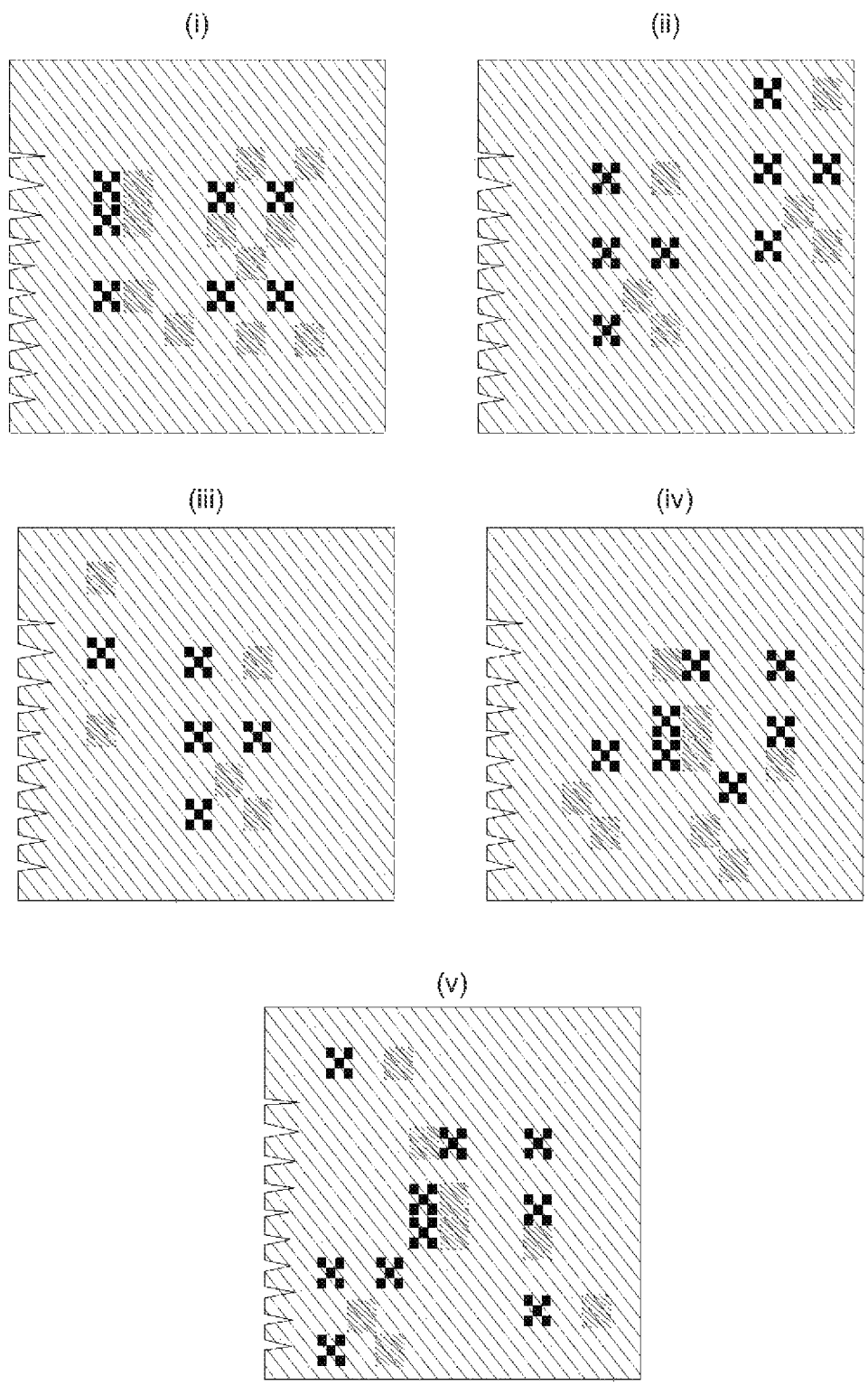

To demonstrate this method for detecting and localizing damage, a hammer-driven hole punch (about 3 mm diameter) is used to induce mechanical damage at a sequence of specified nodes, as shown in FIG. 4D. The electrically independent properties of the LM-elastomer composites enable multiple damage events along the same conductive LM trace, even when portions of the LM trace are completely removed. During damage, the LM traces are electrically connected to the LMEE composite allowing the severed trace to be automatically reconfigured around the damage region without the loss of conductivity. With this sensing scheme and material architecture, the first two damage events are detected with 100% probability and is observed as the minimum number of fully localized damage locations (100% probability) for any active-matrix grid that is at least 2×2 in size. In contrast, for the extreme (and rare) case when damage localizes along one vertical line and one horizontal line, the same 10×10 (M rows×N columns) active-matrix grid detects and localizes up to 18 locations, or M+N−2, with 100% probability. For both cases, there are M+N−1 independent events, that is, changes in state, where a new damage event is detected and localized.

Figure 4E:
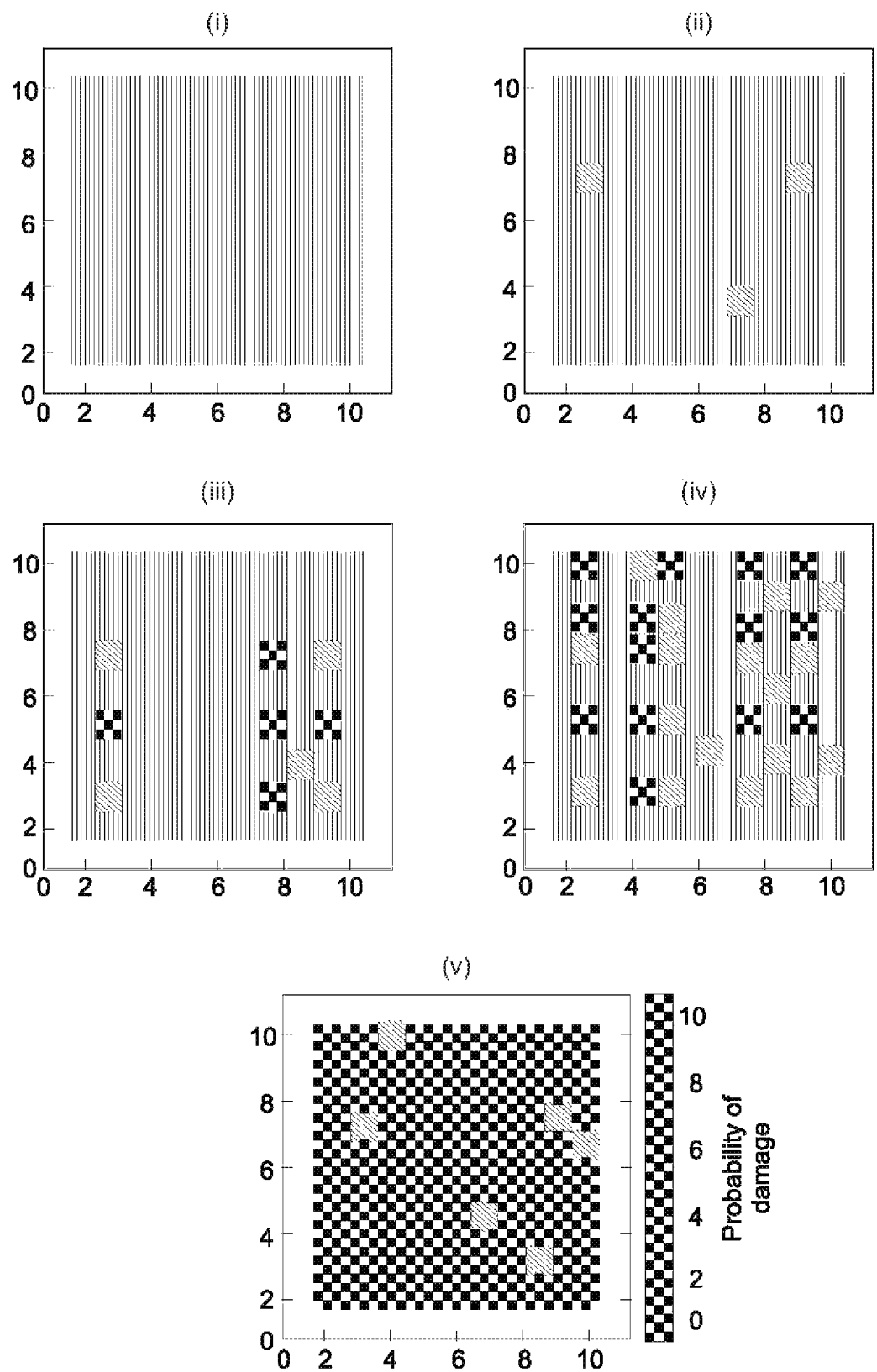

FIG. 4D shows a random sequence of damage events that resulted in six locations of 100% probability along with many more locations where damage is uncertain. The calculated probability of damage for the random sequence is shown in FIG. 4E where the hue of each of the nodes is proportional to the probability of damage at that location. After six damage events, (FIGS. 4D, 4E center), there are four locations where no damage has occurred: (2,2), (7,7), (7,5), and (9,5). This phantom damage signal occurs when multiple locations are activated after a single damage event. To account for this uncertainty, the probability of damage is calculated as 1/(number of activated nodes). For example, when damage occurs at location (9,2), two new locations are detected (9,2) and (2,2), resulting in a 50% probability of damage at each location. The probability of damage ranged from 100 to 5%, with 6 locations of 100% probability (random case). In practice, for a grid with M rows and N columns, the material will be able to detect and localize at least two nodes with 100% probability (worst case, FIGS. 11A, 11B). The maximum number of locations that may be detected and localized with no uncertainty is M+N−2, or 18 nodes for a 10×10 grid as shown in FIG. 12C, 12D. Furthermore, there will be M+N−1 possible independent events, or changes in state where a new damage event is detected and localized. The goal of this damage sensing scheme and material architecture is not to localize every damage event with absolute certainty since a large number of damage events may lead to an irrecoverable state. Instead, the purpose is to introduce an artificial nervous tissue that extends the longevity of soft-matter systems by reporting initial occurrences of damage with high probability and determining its severity so that the host system may respond. To improve accuracy over a large area, multiple active-matrix arrays could be combined on the same surface or object. This example shows the composite's unique ability to detect and localize multiple extreme damage events with high probability, without experiencing catastrophic failure when the active-matrix grid is severed or portions are completely removed.

Figure 5A:
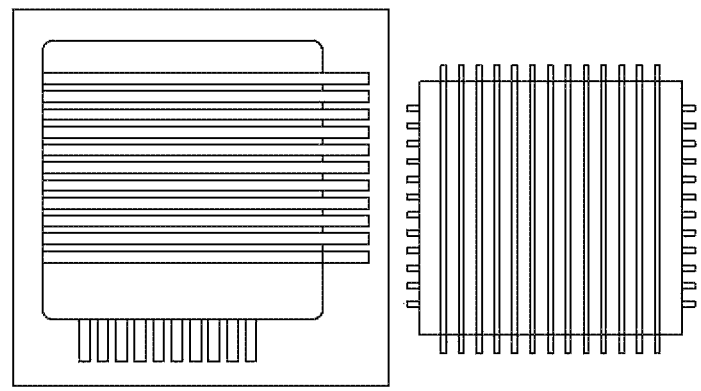
FIGS. 5A-C show detection and localization of ballistic puncture for liquid metal (LM) elastomer composite materials for autonomous damage detection according to the present invention.
Figure 5B:
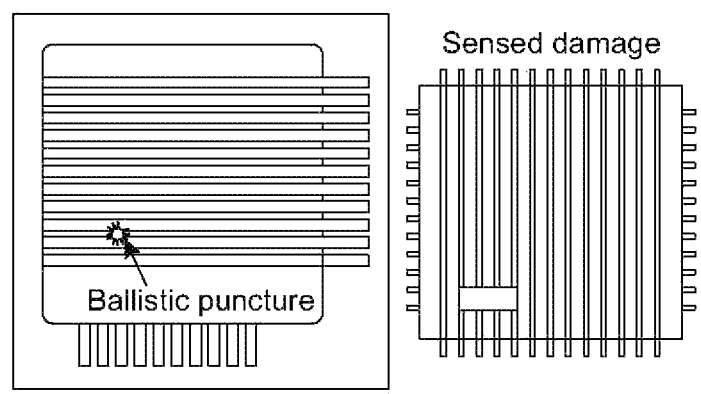
Figure 5C:
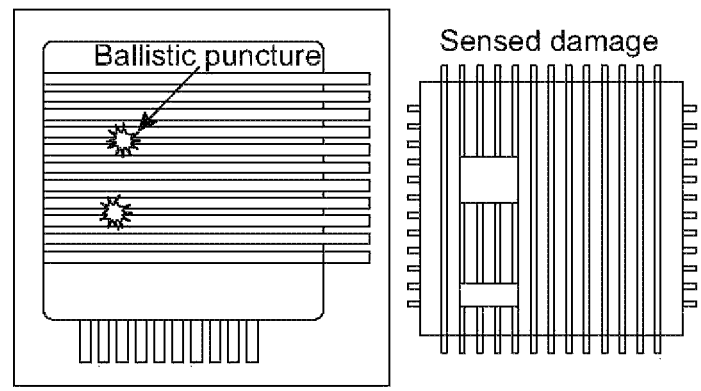

Ballistic puncture. To further examine the effects of extreme damage in an uncontrolled environment, the 2D composite is subjected to ballistic puncture in an outdoor firing range. The composite is suspended as a membrane on an acrylic frame and two projectiles are fired from a .22-caliber long rifle (10/22, Ruger) at a distance of approximately 25 meters (FIG. 5A). The projectile impact results in a large damage zone that is instantaneously activated (FIGS. 5B and 5C). The projectile exit is shown in FIG. 13. The detected damage zone is significantly larger than the entrance or exit hole due to the ballistic shock wave that is generated by the bullets. These results further demonstrate the composite's ability to detect and localize extreme damage in a real-world setting.

Figure 6A:
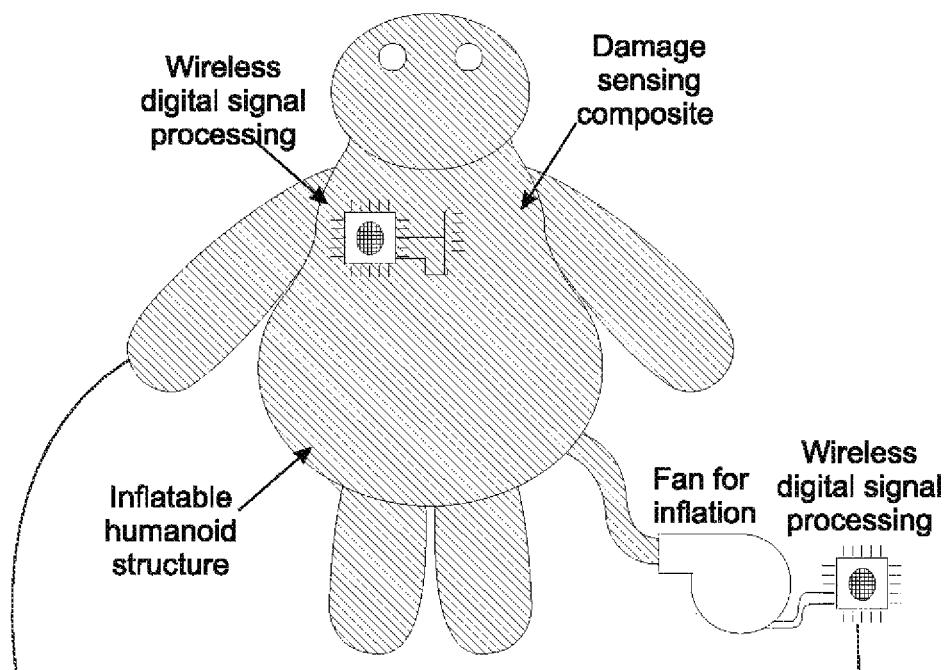
FIGS. 6A-E show autonomous damage detection for pressure regulation for liquid metal (LM) elastomer composite materials for autonomous damage detection according to the present invention.
Figure 6B:
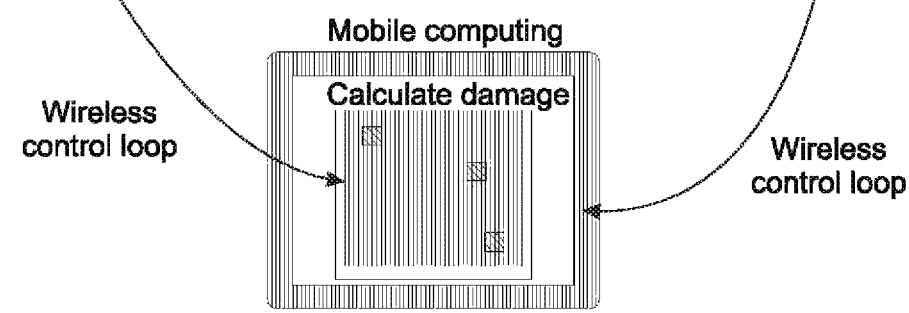
Figure 6C:
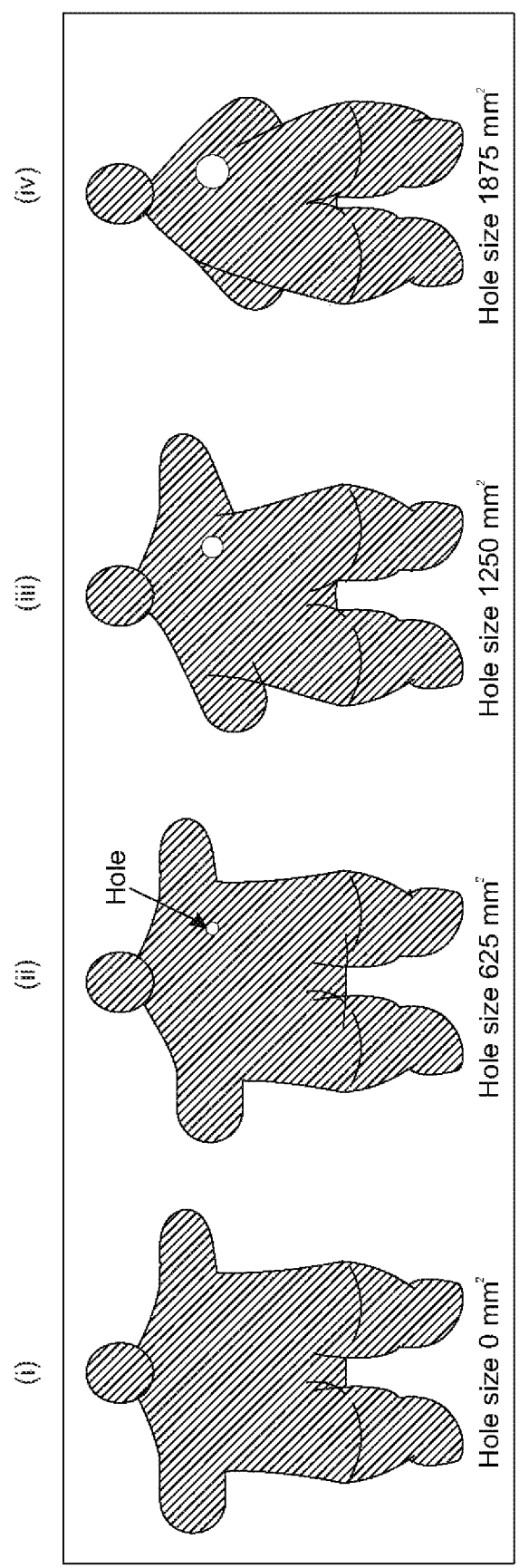
Figure 6D:
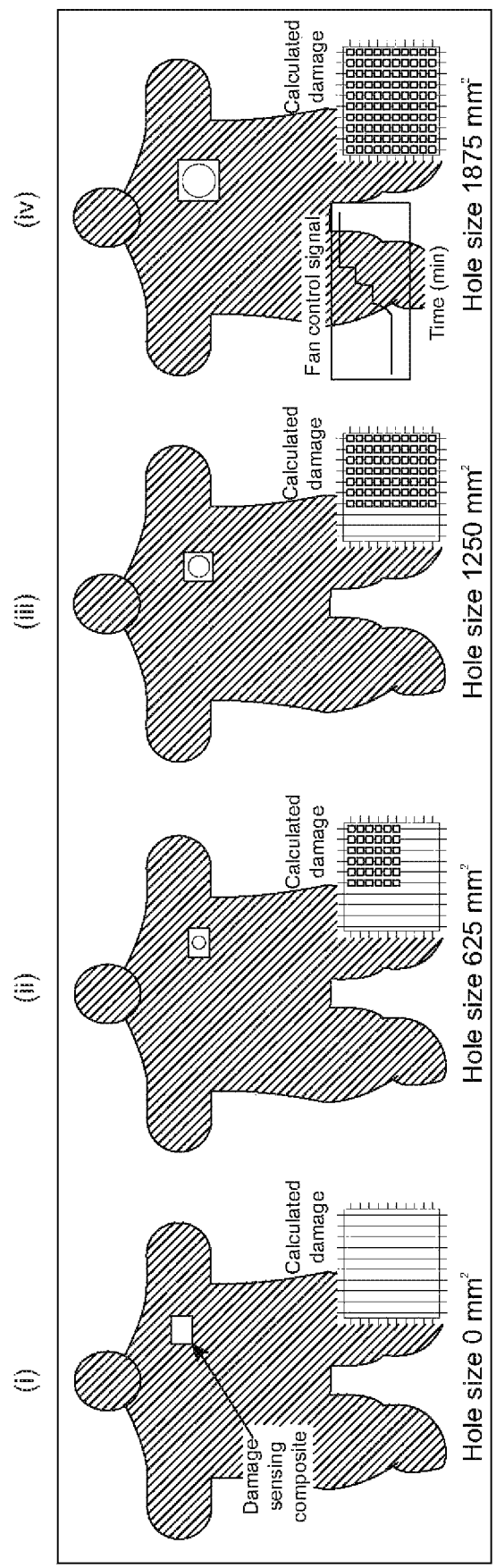
Figure 6E:
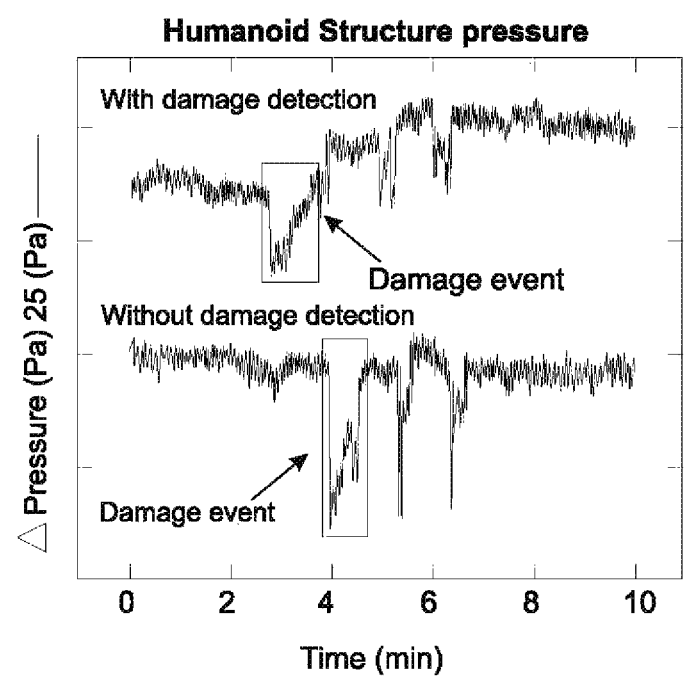

Soft Robotics Demonstration. The electrical response to damage enables integration with existing control systems and provides unique opportunities to monitor structural health within soft robots or inflatable structures. The composite is used to augment the exterior of an inflatable, untethered soft structure intended to mimic a soft humanoid robot (FIG. 6A). The composite functions as an artificial nervous tissue to detect and respond to external damage. The soft robot mimic is composed of a fabric suit, a fan that continuously runs to compensate for leaks, a high-resolution, absolute barometric pressure sensor (BMP280, Bosch), and a plastic skeleton to support the suit (FIG. 7). The fan is set to the minimum velocity required to maintain sufficient inflation, as shown in FIGS. 6C and 6D (left). Three holes, approximately 625 $mm^2$ in size, are cut into the soft robot mimic with a precision knife. In the absence of damage detection and closed-loop control, the soft robot mimic quickly deflates as the hole size increases (FIG. 6C, left to right). The internal pressure of the inflatable structure is continuously monitored sing an absolute barometric pressure sensor (FIG. 6E (gray)). The damage events are clearly distinguishable and appear as sharp decreases in the monitored pressure due to the rapid flow of air leaving the puncture site. However, while an overall decrease in pressure was expected, the monitored change in pressure from the original to final state is on the order of the noise of the high-resolution pressure sensor ($\Delta P<10$ Pa). Consequently, it would be difficult to use this type of transducer for closed-loop control of low pressure, inflatable structures. In contrast, the soft robot mimic that is augmented with the damage sensing composite is capable of detecting and responding to the external damage (FIG. 6D). After detection by the microcontroller, the damage signals are wirelessly transmitted to a mobile computing platform and the effective area of damage is calculated (FIG. 6B). Based on the calculated damage, the on-board control system is able to adjust the velocity of the fan used for inflation to compensate for the loss in pressure caused by the damage (FIG. 6D inset). Here, a small increase in pressure is observed as damage is induced (FIG. 6E, gray). This demonstration illustrates the ease of integration with existing soft-matter systems and compatibility with on-board control, sensing, and actuation commonly used in existing robotic platforms. As with the ballistic impact study, it also provides evidence that the damage-detecting material may function outside of a controlled laboratory setting.

Fabrication. Sylgard 184 (Dow Corning) is prepared per manufacturer's directions by mixing 10:1 oligomer-to-curing agent ratio in a planetary centrifugal mixer, unless otherwise noted. The Sylgard 184 5:1 specimens are prepared by mixing 5:1 oligomer-to-curing agent ratio. Sylgard 527 (Dow Corning) is prepared per manufacturer's directions by mixing equal weights of part A and B in a planetary centrifugal mixer. The elastomer blends are prepared by mixing 80, 60, 40, and 20% weight percent of Sylgard 184 to Sylgard 527 in a planetary centrifugal mixer. Gallium and indium are purchased from Solution Materials, LLC and combined at 75% Ga, 25% In by weight to produce EGaIn. The LM-elastomer composite is fabricated by combining uncured silicone with EGaIn at a 1:1 volume loading. The prepolymer and LM are mixed until an emulsion is formed and no large droplets of LM are visually present. The emulsion is then further mixed using a planetary mixer for 1 min (AR-100, Thinky). After mixing, the composite is cast or molded and subsequently cured (100° C., 1 hour).

Mechanical characterization. Samples are cast in acrylic molds (t=1 mm) using a dogbone specimen geometry (Die B, ASTM D412A) and tested on a materials testing machine (5969, Instron) at a strain rate of 100 mm-$min^{-1}$. To prevent slipping, the samples are glued (Sil-Poxy, Smooth-On) to 6 mm thick acrylic plates and allowed to cure overnight. The LM-elastomer composite is coated on ripstop Nylon (xprd560961, Jo-Ann Fabrics). A dogbone specimen geometry is cut from the sheet using a UV laser cutter (U3 protolaser, LPKF).

Electrical characterization. Activation strain: Samples are cast in acrylic molds (t=1 mm) using a dogbone specimen geometry (Die B, ASTM D412A) and tested on a materials testing machine (5969, Instron) at a strain rate of 100 mm-min$^{-1}$. The tabs of the specimen are activated to the gauge by manually applying pressure. The samples are then glued (Sil-Poxy, Smooth-On) to 6 mm thick acrylic plates and allowed to cure overnight, with the electrical contact outside of the clamping area to reduce possible artifacts. The conductivity between the tabs is monitored using a Universal Serial Bus (USB) DAQ (USB-6002, NI). In its undamaged state following synthesis, this composite is electrically insulating (<10–7 S), even for high liquid metal volume fractions ($\varphi \geq 50\%$). Once activated, the conductivity for a $\varphi=50\%$ composite is $\sigma=1.37\times 103$ S·cm–1. During characterization, the composite is fully activated when the conductance between two adjacent traces was G>0.003 S.

Activation force. The LM-elastomer composite is cast in square acrylic molds (t=500 µm). Traces are drawn into the material using a ball point pen with a center-to-center spacing of 5 mm. The samples are then encapsulated with a 500 µm layer of 10:1 Sylgard 184 (cured at 100° C. for 30 minutes). A glass cylindrical indenter (3 mm diameter) is pressed into the composite at a rate of 0.01 mm-sec$^{-1}$. For cut activation, a precision knife is used to cut across two adjacent traces. The conductivity between adjacent lines is detected using an USB DAQ (USB-6002, NI).

Active-matrix grid of LM. For 1D samples, a grid of LM is spray deposited onto the LM-elastomer composite using a stencil mask (Blazer Orange Laser Mask, IKONICS Imaging). Conductive fabric tape (CN-3490, 3M) is used to interface the LM traces with hook up wiring. The circuit schematic for 1D damage detection is shown in FIG. S8. For 2D samples, a grid of LM is spray deposited onto an elastomer sealing layer using a stencil mask (Blazer Orange Laser Mask, IKONICS Imaging). The LM-elastomer layer is deposited on top of the grid using a thin film applicator (ZUA 2000, Zehntner) and cured (100° C., 1 hour). A grid of LM is then spray deposited onto the LM-elastomer composite. Conductive fabric tape (CN-3490, 3M) is used to interface the LM traces with hook up wiring. For detecting and localizing damage an electronic switch (CD74HC4067SM96, TI) is used in a multiplexer/demultiplexer configuration as shown in FIG. 4B. A microcontroller (ATMega 328) is used to interface with a computer using the USB. The data was plotted using server-side JavaScript (Node.js).

Soft robot fabrication. The soft robot mimic is constructed from a fabric suit (inflatable full body suit, Rubie's), two squirrel cage fans (11270, SparkFun Electronics) that continuously run to compensate for leaks within the fabric suit, and a PVC skeleton to support the fabric suit FIG. 12. A Bluetooth low energy (BLE) UART module (nRF51, Nordic) is connected to the microcontroller, enabling wireless data transmission to a mobile computing platform (Pixel C, Google). The estimated damage is calculated and sent to a second microcontroller (ATMega 328) with a BLE UART module. A DC motor driver (DRV8871, TI) is used to control the velocity of the fans used for inflation. The circuit is powered using two lithium ion batteries (3.7 v, 2000 mAh) connected in series. The internal structure pressure is monitored using a high 407 resolution, absolute barometric pressure sensor (BMP280, Bosch).

Example 2

A damage detecting material system according to the present invention comprises a soft and elastically deformable "artificial nervous tissue" to detect and localize multiple forms of damage. The system comprises micron-sized liquid metal (LM) droplets embedded within a soft silicone elastomer matrix. Referring to FIG. 15, the LM-embedded elastomer (LMEE) composites are incorporated into a soft materials architecture that electrically registers the occurrence and location of mechanical damage caused by compression, fracture, or puncture. When damaged, LM microdroplets within the LMEE rupture and cause in situ conductive pathways to form between neighboring droplets. The damage-initiated change in electrical conductivity is actively detected and localized through an array of LM soft sensing electronics.

Materials. A damage detecting material system comprises a LM-embedded elastomer (LMEE) composite material made by shear mixing Ga-based LM and uncured silicone elastomer at a 1:1 volume ratio ($\varphi=50\%$), to form a suspension of LM microdroplets (about 45 µm particles). This architecture provides significant stress shielding from unintended activation over other droplet film type architectures. An elastomer blend of Sylgard 184 and Sylgard 52752 may be added to the mixture to tailor the mechanical characteristics of the solid-liquid hybrid composite and its sensitivity to mechanical damage. Controlled blends of Sylgard 184 and Sylgard 527 are quantified by the mass percentage of Sylgard 184 within the blend ($\alpha$). In its undamaged state following synthesis, the composite is electrically insulating ($\sigma<10-7$ S·cm$^{-1}$), even at high LM loading ($\varphi \geq 50\%$). Once activated, the conductivity for a $\varphi=50\%$ composite is $\sigma=1.37\times 103$ S·cm$^{-1}$.

Damage Detection. Upon the application of a critical stress, the microdroplets rupture and form locally conductive pathways at the point of damage. This transformation enables the detection of a locally damaged region by monitoring the electrical resistance through a sensing layer. The LM traces for the sensing layer are applied directly on top of the damage detection material through a masked spray coating process. For example, the composite material is cut and then material damage is electrically detected through a sensing network and communicated in real-time (FIG. 16) through LEDs and by monitoring electrical resistance at each trace. Referring to FIG. 16A-B, the traces in the sensing layer are electrically connected by the conductive LM network created by damage from the cut. The signal is a digital response, as the percolation transforms the composite material from electrically insulating to electrically conductive.

Compression damage is also sensed in this system. A cylindrical indenter (about 3 mm diameter) pressed into the composite material activates the material at a load between 20-60 N depending on the elastomer blend. However, a $\alpha=20\%$ blend does not activate under compression and the composite material fractures before conductivity is measured in the sensing electrodes.

2D Damage Detection. To detect damage in 2D, sensing electrodes are positioned on either side of an active damage detection layer. A row/column electrode configuration is used so that damage is detected in a two-dimensional plane to the level of a row/column pair, as shown in FIG. 17B. By serially measuring the conductivity of each row/column pair, damaged regions are identified when a row/column pair is electrically connected. This is due to the electrical percolation of the damage sensing layer, which connects the electrodes through the thickness of the damage sensing layer.

Referring to FIG. 17A, ballistic damage is inflicted on the composite material having a 2D damage detection film through a ballistic impact (.22 caliber round). The damage is localized in two dimensions through the sensing layer, and then a damage response is communicated in real-time over Bluetooth Low Energy to a portable computing device. FIG. 17A shows multiple ballistic damage points identified, FIG. 17B shows the damage quantified (plot), and communicated in real-time. The front and back images show the damage inflicted in the soft matter damage detection system with ballistic impact.

Damage Selectivity. Damage sensing materials that differentiate between multiple damage modes provide tools to evaluate damage severity and size. Referring to FIG. 18, the damage detecting material system comprising an $\alpha=20\%$ composite layered with a $\alpha=100\%$ composite differentiates between indentation and cutting/puncture damage. The LM electrodes are coated on the two different damage sensing layers and each are individually addressed. During indentation with a cylindrical indenter, the $\alpha=100\%$ damage sensing layer activates, while the $\alpha=20\%$ does not activate (as indicated by only the LED on the $\alpha=100\%$ layer turning on). The materials are then cut with a razor blade, with an elliptical section of material removed, and both composites activate (as indicated by illumination of LEDs on both composites).

Example 3

Fabrication. Polydimethylsiloxane (PDMS; Sylgard 184, Dow Corning) is prepared at a 5:1 oligomer/curing agent ratio using an AR-100 THINKY planetary centrifugal mixer (mixing: 1 min, defoaming: 1 min). Gallium and indium are purchased from Solution Materials, LLC and combined at 75% Ga, 25% In by weight to produce EGaIn. EGaIn forms an insulating about 0.5-3 nm oxide skin in the presence of oxygen. The LMEE is fabricated by combining PDMS and EGaIn at LM loadings $\phi=20, 30, 40$ and $50\%$, which corresponds to an LM-to-elastomer mass fraction of 1.61:1, 2.76:1, 4.30:1 and 6.44:1. The PDMS prepolymer and EGaIn are mixed until an emulsion is formed and no large droplets of EGaIn are visually present. The emulsion is then further mixed using a planetary mixer (mixing: 1 min), forming a polydisperse suspension of EGaIn microdroplets dispersed in the silicone elastomer matrix. Additional surfactants are not used as the oxide skin is sufficient as a dispersing and stabilizing agent for the droplets due to the affinity for both the silicone matrix and LM droplet. After mixing, the composite may be cast or molded and subsequently cured. Stencil lithography is used to pattern both bulk sheet and selectively patterned demonstrations (Blazer Orange Laser Mask, IKONICS Imaging). First, a 300 µm layer of PDMS is cast on a polyethylene substrate and cured at 100° C. for 30 min using a thin-film applicator (ZUA 2000, Zehntner). The substrate is allowed to cool and a 550 µm layer of LMEE is cast on top of the PDMS layer using a stencil mask, the mask is removed and the layer is cured at 100° C. for 1 h. LM loading of $\phi=50\%$ is used. In practice, a 2D plotter is used to create the circuit on the exposed composite and then the circuit is sealed in insulating rubber (Sylgard 184, Dow Corning; cured at 100° C. for 30 min) to prevent further trace formation.

Material activation. The material is activated using a 2D plotter and scoring stylus by applying local pressure (Cricut Explore, Cricut). The scoring stylus is clamped in the cutting holder about 5.6 mm from the base. The material is adhered to the standard grip cutting mat, a custom tool (pressure: 150, passes: 5) is used to write the pattern, and the 2D plotter is operated as described in the user manual. After activation, any LM residue on the surface is cleaned using a cotton tip applicator with isopropyl alcohol. To determine the minimum trace spacing, two parallel traces 100 mm in length are drawn to provide sufficient overlap. Center-to-center trace spacings from 1 mm to 3 mm in 250 µm increments are tested. The resistance between the traces is measured using a multimeter (TOL-12967, SparkFun) to determine whether unintended activation has occurred between the closely neighboring traces. Five samples for each spacing are tested to determine the minimum trace spacing. Inadvertent activation may occur, including normal pressure activation, repeated compressive loading, shear activation and bending activation.

Electronic counter demonstration. A microcontroller (ATmega32u4, Atmel) is used to send serial commands through a four-wire interface to a seven-segment clock display with a serial interface (Adafruit). A section of the four-wire interface is replaced by the LM-elastomer composite to demonstrate the independent capabilities. The LMEE is prepared as described above and the composite is activated as described above. The clock is updated every second.

Mechanical and electrical characterization. Samples are prepared in a dogbone geometry (Die A, ASTM D412A) and tested on a materials testing machine (5969, Instron) at a strain rate of 100 mm min$^{-1}$. After sample fabrication and activation, the samples are glued (Sil-Poxy, Smooth-On) to 6 mm thick acrylic grips and cured overnight, with the electrical contact outside the clamping area to reduce possible artefacts. The 1 mm thick samples are molded ($\phi=0\%$, 50%). For mechanical characterization, the samples are placed on a flat surface overnight at room temperature and post cured in a 100° C. oven for 1 h. Two traces are drawn down the center of the dogbone. The sample is tested at an extension rate of 150 mm sec$^{-1}$ using an orbital jigsaw (Black and Decker BDEJS600C). For electro-mechanical characterization, a single trace is drawn down the center of the dogbone. For the resistance versus length and electromechanical coupling characterization, the resistance of the trace is measured using a micro-ohm meter (34420A, HP) with a four-point probe. The external analog data from the materials testing machine (2310-907, Instron) are collected at a rate of 1 kHz using an USB DAQ (USB-6002, NI). The data are collected using the serial interface (MATLAB, 2016a). For all electrical measurements, the electrical contact is scored using a razor blade and additional EGaIn is added to reduce the contact resistance.

IV curves. A Keithley 2460 SourceMeter with a four-point probe is used to generate current-voltage curves. A voltage of 1 V is sourced and the current is measured for $\phi=20-50\%$ samples and a $\phi=50\%$ sample is also evaluated by sourcing 5 A and measuring the voltage for a trace length of 45 mm. The relative change in temperature is calculated ($\Delta T=\Delta\rho/\alpha\rho 0$) using the temperature coefficient for gallium ($\alpha=0.004$), an effective trace width (w=500 µm) and thickness (t=550 µm), trace length of 45 mm and electrical resistivity at room temperature ($\rho 0=RA/l=(1.51)(2.75\times 10-7)/(0.045)=9.23\times 10-6$ Ωm, where R, A and l are the trace resistance, cross-sectional area and length, respectively).

Volumetric conductivity. The volumetric conductivity ($\sigma=l/RA$) for $\phi=50\%$ is calculated using an effective trace width (w=500 μm) and thickness (t=550 μm). The l/R relationship is calculated by fitting a linear line with the y intercept equal to zero to the $\phi=50\%$.

Self-healing characterization. The samples are prepared as described above. The change in resistance is measured using a voltage divider with a 560Ω resistor. The change in voltage across the LMEE is monitored using an USB DAQ (USB-6002, NI) and the data are collected at 50 kHz using a desktop computer (MATLAB, 2016a). The data are filtered using a low-pass filter.

Soft robot fabrication. The limbs of the soft quadruped use a SMA wire (0.3 mm diameter, Dynalloy) embedded in thermal tape (H48-2, T-Global). The SMA wire is bent into a U-shape with sharp corners (width=13 mm, length=55 mm) and bonded to thermal tape (length=55 mm, width=22 mm, thickness=0.5 mm) using a thin layer (200 μm) of partially cured silicone elastomer (Ecoflex 00-30, Smooth-On; 7 min at 50° C.). A second layer of silicone elastomer (400 μm) is applied to the stack and partially cured (7 min at 50° C.). In parallel, a 200 μm layer of silicone elastomer is partially cured on pre-stretched ($\lambda=1.5$) thermal tape (length=70 mm, width=60 mm, thickness=0.5 mm). After curing, the layers are clamped together with binder clips and fully cured at 50° C. for 10 min. The excess material is cut off along the outline of the unstretched thermal tape layer.

Each of the limbs is glued (All-Purpose Krazy Glue) to an acrylic frame. Non-insulated wire ferrules are crimped to the ends of the SMA wire and soldered to ring terminals that are mechanically fixed to the acrylic frame using bolt and nut fasteners. The fasteners provide an electrical connection to the LMEE sheet similar to a via in a printed circuit board. The LMEE sheet is placed over the bolts and nuts are used as a clamp to mechanically and electrically connect the LMEE sheet to the acrylic frame, SMA actuators and control board.

Conclusion. A soft biomimetic composite according to the present invention may be suitable for use as artificial nervous tissue to detect, communicate, and respond to detrimental, mechanical damage events. Mechanical damage, such as compression, fracture or puncture, causes embedded droplets of liquid metal (LM) suspended in a soft elastomer matrix to rupture, creating local changes in electrical conductivity. By tailoring the compliance of the LM-elastomer composite, changes in electrical conductivity only occur for certain types of damage. The local changes in electrical conductivity are actively detected and localized using a highly deformable active-matrix grid of LM. The mechanical compliance of the elastomer matrix may be used to tailor the damage response of LMEEs such that changes in electrical conductivity only occur for certain types of damage. The contribution of the integration of a highly deformable active-matrix grid of LM traces that measure these local changes in conductivity may actively detect and localize the material damage. Furthermore, the composite may be coated on a variety of substrates and continue to operate even under extreme damage events such as ballistic puncture. When tightly coupled with actuation, computation, and communication, this system provides a method for structural health monitoring in an inflatable soft robot mimic, enabling algorithmic adaptation to environmental changes that were undetectable using a traditional high-resolution pressure sensor. This technology, coupled with methods for self-healing, provides a path forward for continuous structural health monitoring, self-diagnosis, and repair of soft structures to rival the longevity that is exhibited in natural, biological systems.

The present invention may comprise one or more of the following aspects:

Aspect 1. A liquid metal embedded elastomer composite material comprising a polymer; a plurality of droplets comprising a liquid metal dispersed within the polymer; and at least one electrically conductive array comprising a conductive material applied to a surface of the polymer; and optionally, a polymer sealing layer applied to the surface of the at least one electrically conductive array; wherein the material is insulating when the plurality of droplets is not ruptured, and wherein the material is conductive when at least a portion of the plurality of droplets is ruptured.

Aspect 2. The material of any of the foregoing aspects comprising at least one conductive network comprising an interconnected series of ruptured droplets of the liquid metal.

Aspect 3. The material of any of the foregoing aspects, wherein the material detects at least one stimulus selected from the group consisting of compression, fracture, puncture, rupturing, cutting, tearing, and ripping when at least a portion of the plurality of droplets is ruptured.

Aspect 4. The material of any of the foregoing aspects, wherein the material is insulating when the material detects compression and the plurality of droplets is not ruptured, and the material is conductive when the material detects at least one of fracture, puncture, rupturing, cutting, tearing, and ripping when at least a portion of the plurality of droplets is ruptured.

Aspect 5. The material of any of the foregoing aspects, wherein the polymer and polymer sealing layer independently comprise at least one of polyurethane, polysiloxane, polyacrylate, natural rubber, block copolymer elastomers, and thermoplastic elastomers.

Aspect 6. The material of any of the foregoing aspects, wherein the liquid metal comprises at least one of eutectic gallium indium, gallium alloys, gallium-indium-tin, and mercury.

Aspect 7. The material of any of the foregoing aspects, wherein the liquid metal comprises a eutectic alloy.

Aspect 8. The material of any of the foregoing aspects, wherein the droplets comprise a diameter from 10 nanometers to 400 micrometers.

Aspect 9. The material of any of the foregoing aspects, wherein the droplets and the conductive material comprise the same liquid metal.

Aspect 10. The material of any of the foregoing aspects, wherein the at least one electrically conductive array comprises a first electrically conductive array and a second electrically conductive array, and the polymer is intermediate the first electrically conductive array and the second electrically conductive array.

Aspect 11. The material of any of the foregoing aspects, wherein each of the at least one electrically conductive coating independently comprises at least one liquid metal trace.

Aspect 12. The material of any of the foregoing aspects, wherein each of the at least one liquid metal trace comprises at least one of a line and a serpentine.

Aspect 13. The material of any of the foregoing aspects, wherein each of the first electrically conductive array and the second electrically conductive array independently comprise an electrically conductive grid having orthogonal liquid metal traces.

Aspect 14. A device comprising the material of any of the foregoing aspects.

Aspect 15. The device of any of the foregoing aspects comprising a substrate coated with the polymer.

Aspect 16. The material of any of the foregoing aspects, wherein the substrate comprises at least one of rigid plastic, flexible plastic, metal, fabric, ceramic and glass.

Aspect 17. The material of any of the foregoing aspects, wherein the device is selected from the group consisting of artificial skin, humanoid robots, robotic prosthetics, and soft wearable robots.

Aspect 18. The material of any of the foregoing aspects comprising an output device configured to output an indicator based upon the stimuli detected by the material, wherein the indicator includes at least one of an audible output, a visual output, or a tactile output.

Aspect 19. The material of any of the foregoing aspects, wherein the indicator is not activated when one of the at least one stimuli is detected, and wherein the indicator is activated when another one of the at least one stimuli is detected.

Aspect 20. A method of making the device of any of the foregoing aspects, the method comprising: applying the polymer comprising the plurality of droplets comprising a liquid metal dispersed within the polymer to a substrate; and applying a coating of liquid metal to the polymer to form the at least one electrically conductive array; and optionally, applying the polymer sealing layer to the at least one electrically conductive array.

REFERENCES

Markvicka, E. J., Bartlett, M. D., Huang, X. & Majidi, C. Soft Electronics Skin for Multi-Site Damage Detection and Localization. *Adv. Funct. Mater.* 2019, 1900160.

Markvicka, E. J., Bartlett, M. D., Huang, X. & Majidi, C. An autonomously electrically self-healing liquid metal-elastomer composite for robust soft-matter robotics and electronics. *Nature materials* 17, 618-624 (2018).

Bartlett, M. D., Markvicka, E. J., Tutika, R., & Majidi, C. Soft-matter damage detection systems for electronics and structures. *Nondestructive Characterization and Monitoring of Advanced Materials, Aerospace, Civil infrastructure, and Transportation XIII*. Vol. 10971. International Society for Optics and Photonics, 2019.

United States Patent Application Publication Nos. 20170218167, 20200296825, and 20200328007.

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments have been illustrated and described, it would be obvious to those skilled in the art that various other changes and modifications may be made without departing from the spirit and scope of the invention. Those skilled in the art will recognize or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that are within the scope of this application.

What is claimed is:

1. A liquid metal embedded elastomer composite material comprising:
   a polymer;
   a plurality of droplets comprising a liquid metal dispersed within the polymer; and
   at least one electrically conductive array comprising a conductive material applied to a surface of the polymer; and
   optionally, a polymer sealing layer applied to the surface of the at least one electrically conductive array;
   wherein the material is insulating when the plurality of droplets is not ruptured, and
   wherein the material is conductive when at least a portion of the plurality of droplets is ruptured.

2. The material of claim 1 comprising at least one conductive network comprising an interconnected series of ruptured droplets of the liquid metal.

3. The material of claim 1, wherein the material detects at least one stimulus selected from the group consisting of compression, fracture, puncture, rupturing, cutting, tearing, and ripping when at least a portion of the plurality of droplets is ruptured.

4. The material of claim 1, wherein the material is insulating when the material detects compression and the plurality of droplets is not ruptured, and the material is conductive when the material detects at least one of fracture, puncture, rupturing, cutting, tearing, and ripping and at least a portion of the plurality of droplets is ruptured.

5. The material of claim 1, wherein the polymer and polymer sealing layer independently comprise at least one of polyurethane, polysiloxane, polyacrylate, natural rubber, block copolymer elastomers, and thermoplastic elastomers.

6. The material of claim 1, wherein the liquid metal comprises at least one of eutectic gallium indium, gallium alloys, gallium-indium-tin, and mercury.

7. The material of claim 1, wherein the liquid metal comprises a eutectic alloy.

8. The material of claim 1, wherein the droplets comprise a diameter from 10 nanometers to 400 micrometers.

9. The material of claim 1, wherein the droplets and the conductive material comprise the same liquid metal.

10. The material of claim 1, wherein the at least one electrically conductive array comprises a first electrically conductive array and a second electrically conductive array, and the polymer is intermediate the first electrically conductive array and the second electrically conductive array.

11. The material of claim 10, wherein each of the at least one electrically conductive coating independently comprises at least one liquid metal trace.

12. The material of claim 11, wherein each of the at least one liquid metal trace comprises at least one of a line and a serpentine.

13. The material of claim 12, wherein each of the first electrically conductive array and the second electrically conductive array independently comprise an electrically conductive grid having orthogonal liquid metal traces.

14. A device comprising the material of claim 13.

15. The device of claim 14 comprising a substrate coated with the polymer.

16. The device of claim 15, wherein the substrate comprises at least one of rigid plastic, flexible plastic, metal, fabric, ceramic and glass.

17. The device of claim 14, wherein the device is selected from the group consisting of artificial skin, humanoid robots, robotic prosthetics, and soft wearable robots.

18. The device of claim 14 comprising an output device configured to output an indicator based upon the stimuli detected by the material, wherein the indicator includes at least one of an audible output, a visual output, or a tactile output.

19. The device of claim 18, wherein the indicator is not activated when one of the at least one stimuli is detected and the indicator is activated when another one of the at least one stimuli is detected.

20. A method of making the device of claim 14, the method comprising:
  applying the polymer comprising the plurality of droplets having that liquid metal dispersed therein to a substrate;
  applying a coating of liquid metal to the polymer to form the at least one electrically conductive array; and
optionally, applying the polymer sealing layer to the at least one electrically conductive array.

* * * * *